US008209946B2

(12) United States Patent
Neudorf et al.

(10) Patent No.: US 8,209,946 B2
(45) Date of Patent: Jul. 3, 2012

(54) TRAILING TRANSPORT ROTARY MOWER

(75) Inventors: Blake Neudorf, Warman (CA); Cam Wilson, Saskatoon (CA); Monty Summach, Saskatoon (CA)

(73) Assignee: Highline Manufacturing Ltd., Vonda, Saskatchewan (CA)

( * ) Notice: Subject to any disclaimer, the term of this patent is extended or adjusted under 35 U.S.C. 154(b) by 0 days.

(21) Appl. No.: 12/942,535

(22) Filed: Nov. 9, 2010

(65) Prior Publication Data
US 2011/0209453 A1  Sep. 1, 2011

(30) Foreign Application Priority Data
Nov. 9, 2009 (CA) .................................. 2685195

(51) Int. Cl.
*A01D 34/00* (2006.01)
(52) U.S. Cl. ......................... 56/15.2; 172/240
(58) Field of Classification Search .................. 56/15.2, 56/6, 13.6, 14.9, 218, 228, 15.8, 15.6, 7, 56/15.3, 16.2, DIG. 22; 172/311, 456, 269, 172/240, 248, 310; 280/29
See application file for complete search history.

(56) References Cited

U.S. PATENT DOCUMENTS

| | | | | |
|---|---|---|---|---|
| 2,696,772 A * | 12/1954 | Underdown | ............... | 280/414.5 |
| 2,952,961 A * | 9/1960 | Engler | ........................... | 56/13.6 |
| 3,339,353 A * | 9/1967 | Schreyer | .............................. | 56/6 |
| 3,418,790 A * | 12/1968 | Whitfield et al. | ................... | 56/6 |
| 3,473,302 A | 10/1969 | Caldwell | | |
| 3,500,619 A * | 3/1970 | Bacon | ................. | 56/6 |
| 4,854,112 A * | 8/1989 | Holley et al. | ........................ | 56/6 |
| 5,000,268 A * | 3/1991 | Zimmerman | ................. | 172/240 |
| 5,113,640 A | 5/1992 | Colistro | | |
| 5,136,828 A * | 8/1992 | Ermacora | ................... | 56/10.2 R |
| 5,280,695 A * | 1/1994 | Nunes et al. | ......................... | 56/6 |
| 6,546,707 B2 * | 4/2003 | Degelman et al. | ............. | 56/15.2 |
| 6,594,980 B2 * | 7/2003 | Oka et al. | ........................ | 56/15.8 |
| 6,684,615 B1 * | 2/2004 | Bland et al. | ..................... | 56/15.6 |
| 6,854,250 B2 * | 2/2005 | Boyko | ............................ | 56/14.9 |
| 7,089,722 B2 * | 8/2006 | Laskowski | ..................... | 56/14.9 |
| 7,438,137 B2 * | 10/2008 | Pederson et al. | .............. | 172/311 |
| 7,513,095 B2 | 4/2009 | Hofmann et al. | | |
| 7,640,719 B2 * | 1/2010 | Boyko | ............................ | 56/13.6 |

* cited by examiner

*Primary Examiner* — Arpad Fabian-Kovacs
(74) *Attorney, Agent, or Firm* — Dicke, Billig & Czaja, PLLC

(57) ABSTRACT

A rotary mower has a center deck and wing decks extend laterally outward from the center deck and are oriented horizontally when in the field position. An actuator moves each wing deck from the field position to the raised transport position where the wing decks extend upward. A transport wheel and a field wheel are mounted on each side so that in the field position, the transport wheel is above the ground and the field wheel is supports the wing deck and in the raised transport position the field wheel is above the ground and the transport wheel supports the wing deck. A wing wheel supports each wing deck when in the field position. As the center deck is towed forward in the raised transport position, the wing decks pivot rearward with respect to the center deck from the raised transport position to the trailing transport position.

42 Claims, 20 Drawing Sheets

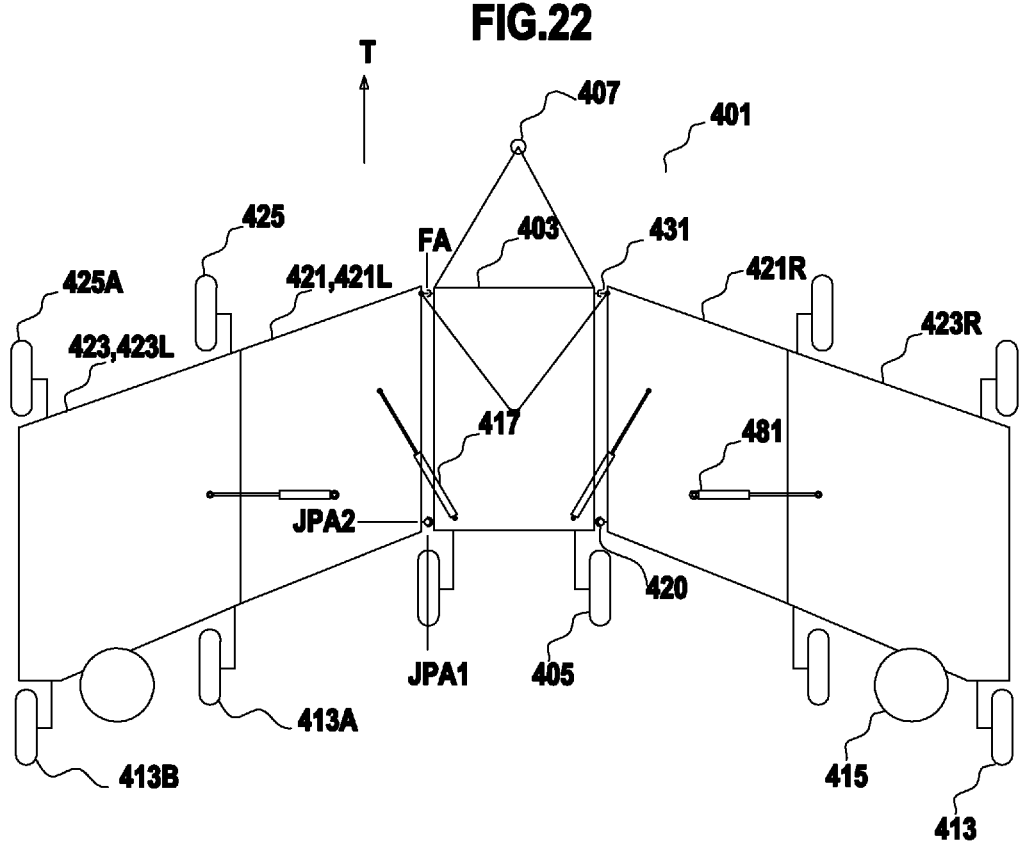

TRAILING TRANSPORT ROTARY MOWER

This invention is in the field of rotary mowers that are towed by a tractor or the like, and in particular a wide rotary mower that includes a number of wing sections mounted to a tool bar.

BACKGROUND

Typical rotary mowers have a horizontally oriented mower deck mounted on wheels for movement along the ground and a horizontally oriented rotating blade mounted under the deck and driven by a gearbox mounted on the deck and connected to the power take-off of a towing tractor.

Wider rotary mowers typically include a center deck with right and left wing decks pivotally attached to the center deck about horizontal wing pivot axes oriented substantially in alignment with an operating travel direction of the mower. For transport the wings are pivoted up about the wing pivot axes to a generally vertical transport position. One or more rotating blades are mounted under each wing deck.

In such mowers with multiple blades the blades must be oriented to overlap somewhat so that vegetation across the entire width of the mower is cut. This is typically addressed by having each blade mounted forward or rearward of adjacent blades so that the circle described by the path of one blade extends laterally beyond the circular path of the adjacent blades, as illustrated for example in U.S. Pat. No. 5,113,640 to Colistro, U.S. Pat. No. 7,513,095 to Hofmann et al., and U.S. Pat. No. 3,473,302 to Caldwell.

The three section Colistro mower has a center deck and right and left wing decks. A single center blade is mounted rearward on the center deck and each wing deck has an inner blade mounted forward of the center blade, and an outer blade mounted rearward of the inner blade so the blades are staggered forward and rearward across the width of the mower. The wing decks fold up to a generally vertical transport position.

Similarly the five section mower of Hofmann has a center deck and right and left inner wing decks pivotally attached to the center deck, and further has right and left outer wing decks pivotally attached to outer edges of the corresponding inner wing decks. A single center blade is mounted forward on the center deck. Each inner wing deck has an inner blade mounted rearward of the center blade, and an outer blade mounted forward of the inner blade. Each outer wing deck has a single blade mounted rearward of the outer blade on the inner wing deck. Thus as with Colistro the blades of Hofmann are staggered forward and rearward across the width of the mower. For transport the outer wings fold up about outer wing pivot axes with respect to the inner wings, and the inner wings then fold upward about inner wing pivot axes with respect to the center deck.

The five section mower of Caldwell similarly has a center deck and right and left inner wing decks pivotally attached to the center deck, and further has right and left outer wing decks pivotally attached to outer edges of the corresponding inner wing decks. A single blade is mounted under each deck. In contrast to the above mowers however, the blades of Caldwell are swept back from the center blade with the inner wing blade rearward of the center blade and the outer blade rearward of the inner blade. For transport the wings fold upward in a manner similar to the Hofmann mower.

As is commonly found with many implements, wider mowers are desirable to provide increased mowing capacity economically and efficiently.

SUMMARY OF THE INVENTION

It is an object of the present invention to provide a rotary mower apparatus that overcomes problems in the prior art.

In a first embodiment the present invention provides rotary mower apparatus movable from a field position to a raised transport position, and from the raised transport position to a trailing transport position. The apparatus comprises a center deck mounted on center wheels for movement along the ground in an operating travel direction, and a hitch at a front end of the center deck adapted to be attached to a towing vehicle. Right and left wing decks are movably attached on corresponding right and left sides of the center deck such that in the field position, each wing deck is oriented substantially horizontally and extends laterally from the center deck, and such that in the raised transport position each wing deck extends upward and extends laterally from the center deck, and such that in the trailing transport position each wing deck extends upward and rearward from the center deck. A wing lift actuator is operative to move each wing deck from the field position to the raised transport position. A transport wheel and a field wheel are attached to a wing deck on each side of the center deck such that in the field position, the transport wheel is above the ground and the field wheel is on the ground oriented to roll in the operating travel direction supporting the wing deck above the ground, and in the raised transport position the field wheel is above the ground and the transport wheel is on the ground oriented to roll in a direction transverse to the operating travel direction and supporting the wing deck above the ground. A wing wheel is mounted such that in the field position, the wing wheel is on the ground supporting the wing deck above the ground, and such that in the raised transport position the wing wheel is above the ground. A center blade is mounted under the center deck, and right and left blades are mounted under corresponding right and left wing decks such that when in the field position the right and left blades are oriented such that cutting paths of the right and left blades overlap a cutting path of the center blade. A drive is operative to rotate the center, right, and left blades, and a cutting height actuator is operative to raise and lower the center deck and right and left wing decks with respect to the ground. As the center deck is towed forward in the raised transport position, the wing decks pivot rearward with respect to the center deck from the raised transport position to the trailing transport position.

In a second embodiment the present invention provides a rotary mower apparatus movable from a field position to a raised transport position, and from the raised transport position to a trailing transport position. The apparatus comprises a center deck mounted on center wheels for movement along the ground in an operating travel direction, and a hitch at a front end of the center deck adapted to be attached to a towing vehicle. Right and left tool bars are pivotally mounted at an inner ends thereof to rear portions of the center deck and are movable from an extended position, where the tool bars extend laterally outward from the center deck to corresponding right and left sides of the center deck and incline rearward, to a trailing position where the tool bars extend rearward from the center deck substantially in alignment with the operating travel direction. A field wheel and a transport wheel are mounted on outer portions of each tool bar and a tool bar actuator is operative to move each tool bar from the field position, where the transport wheel is above the ground and where the field wheel is on the ground oriented to roll in the operating travel direction supporting the tool bar above the ground, to the raised transport position where the field wheel is above the ground and the transport wheel is on the ground oriented to roll in a direction substantially parallel to a longitudinal axis of the tool bar supporting the tool bar above the ground. Right and left wing decks are each attached at rear portions thereof to a corresponding tool bar such that in the field position, the wing decks extend substantially horizontally forward from rear ends thereof located below the tool bar, to front ends thereof forward of the tool bar and supported by front caster wheels, and such that in the transport positions the wing decks extend upward from the tool bars. Right and left wing support mechanisms are mounted to front portions of the center deck and right and left wing decks, the wing support mechanisms operative in the field position to engage and pivotally connect front portions of the right and left wing decks to corresponding front portions of the center deck such that the front portions of the wing decks are supported on the center deck and can pivot up and down with respect to the center deck, and wherein when the front portions of the wing decks move upward to the raised transport position, the wing support mechanisms disengage. A center blade is mounted under the center deck, and right and left blades are mounted under corresponding right and left wing decks such that when in the field position the right and left blades are rearward of the center blade such that cutting paths of the right and left blades overlap a cutting path of the center blade. A drive is operative to rotate the center, right, and left blades, and a cutting height actuator is operative to raise and lower the center deck and right and left wing decks with respect to the ground. As the center deck is towed forward in the raised transport position, the tool bars pivot rearward with respect to the center deck from the extended position to the trailing transport position.

In a third embodiment the present invention provides a rotary mower apparatus movable from a field position to a raised transport position, and from the raised transport position to a trailing transport position. The apparatus comprises a center deck mounted on center wheels for movement along the ground in an operating travel direction, and a hitch at a front end of the center deck adapted to be attached to a towing vehicle. Right and left tool bars are pivotally mounted at an inner ends thereof to rear portions of the center deck and are movable from an extended position, where the tool bars extend laterally outward from the center deck to corresponding right and left sides of the center deck and incline rearward, to a trailing position where the tool bars extend rearward from the center deck substantially in alignment with the operating travel direction. A field wheel and a transport wheel are mounted on outer portions of each tool bar, and a tool bar actuator is operative to move each tool bar from the field position, where the transport wheel is above the ground and where the field wheel is on the ground oriented to roll in the operating travel direction supporting the tool bar above the ground, to the raised transport position where the field wheel is above the ground and the transport wheel is on the ground oriented to roll in a direction substantially parallel to a longitudinal axis of the tool bar supporting the tool bar above the ground. Right and left inner wing decks and right and left outer wing decks are attached to corresponding right and left tool bars, each outer wing deck pivotally attached at an inner edge thereof to a corresponding outer edge of the corresponding inner wing deck about a wing pivot axis oriented substantially perpendicular to the longitudinal axis of the corresponding tool bar. Each inner and outer wing deck is attached at a rear portion thereof to the corresponding tool bar such that in the field position, each wing deck extends substantially horizontally forward from a rear end thereof located below the tool bar, to a front end thereof forward of the tool bar and supported by a front caster wheel, and such that in the transport positions each wing deck extends upward from the tool bar. Right and left wing support mechanisms are mounted to front portions of the center deck and right and left inner wing decks, the wing support mechanisms operative in the field position to engage and pivotally connect front portions of the right and left inner wing decks to corresponding front portions of the center deck such that the front portions of the inner wing decks are supported on the center deck and can pivot up and down with respect to the center deck, and wherein when the front portions of the inner wing decks move upward to the raised transport position, the wing support mechanisms disengage. A center blade is mounted under the center deck, and right and left inner and outer blades are mounted under corresponding right and left inner and outer wing decks such that when in the field position the right and left outer blades are rearward of the right and left inner blades, and the right and left inner blades are rearward of the center blade such that cutting paths of the right and left outer blades overlap a cutting path of the right and left inner blades, and cutting paths of the right and left inner blades overlap a cutting path of the center blade. A drive is operative to rotate the center blade and the right and left inner and outer blades, and a cutting height actuator is operative to raise and lower the center deck and right and left inner and outer wing decks with respect to the ground. As the center deck is towed forward in the raised transport position, the tool bars pivot rearward with respect to the center deck from the extended position to the trailing transport position.

The rotary mower apparatus of the invention is constructed such that center deck does not rotate for transport, only the wings do. The center deck provides convenient stable mounts for the hydraulic cylinders, and the rotating wings. The wings extend laterally out and rotate vertically. The wing decks can be mounted to the rear of the center deck so as the front of the wing decks move up during lifting of the wings, the torque generated presses the front of the center deck or front hitch downward as compared to many implements where moving to transport position can cause a negative hitch weight. The advantages are significant specifically with regards to the safety of operation.

The apparatus also utilizes larger diameter blades to provide a wide mower with a driveline having reduced number of gearboxes and thus reduced complexity.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 22 is a further alternate embodiment of a rotary mower apparatus of the present invention with inner and outer wing decks, and where the transport and field wheels are attached directly to the wing decks and where there is no tool bar.

DETAILED DESCRIPTION OF THE ILLUSTRATED EMBODIMENTS

Figure 5:
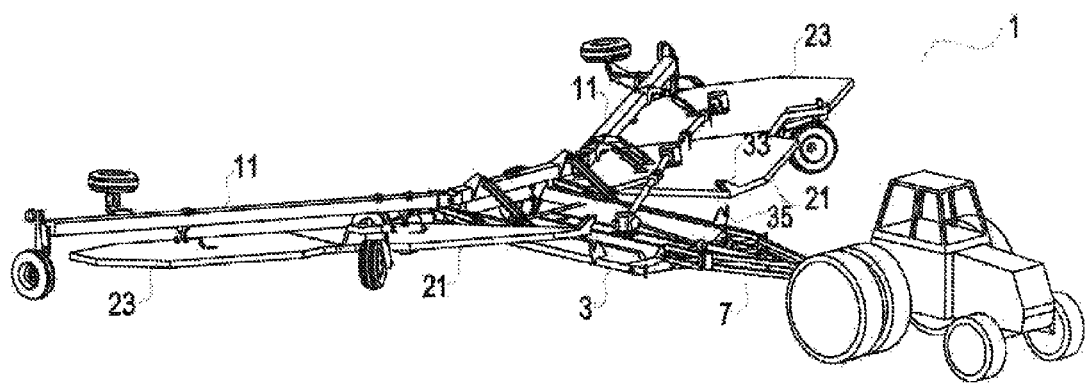
FIG. 5 is a front perspective view of the embodiment of FIG. 1 in a partially raised position where the wing support mechanisms are disengaged.
Figure 6:
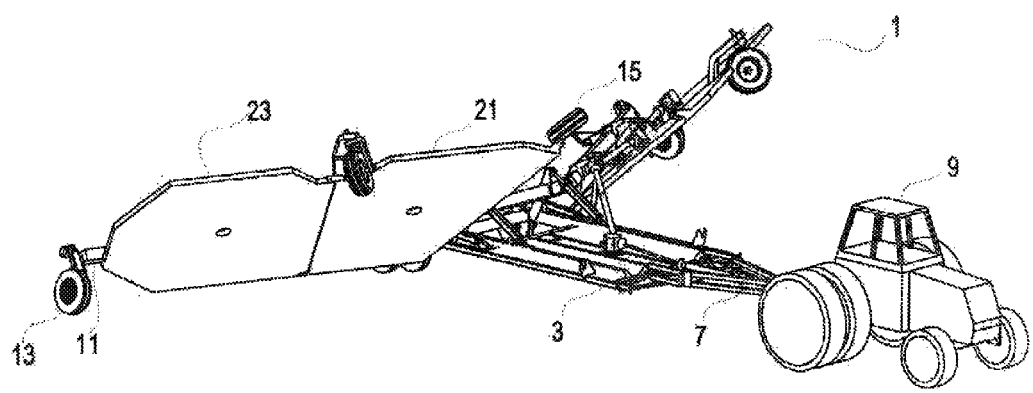
FIG. 6 is a front perspective view of the embodiment of FIG. 1 in an intermediate position between the field and transport positions.
Figure 7:
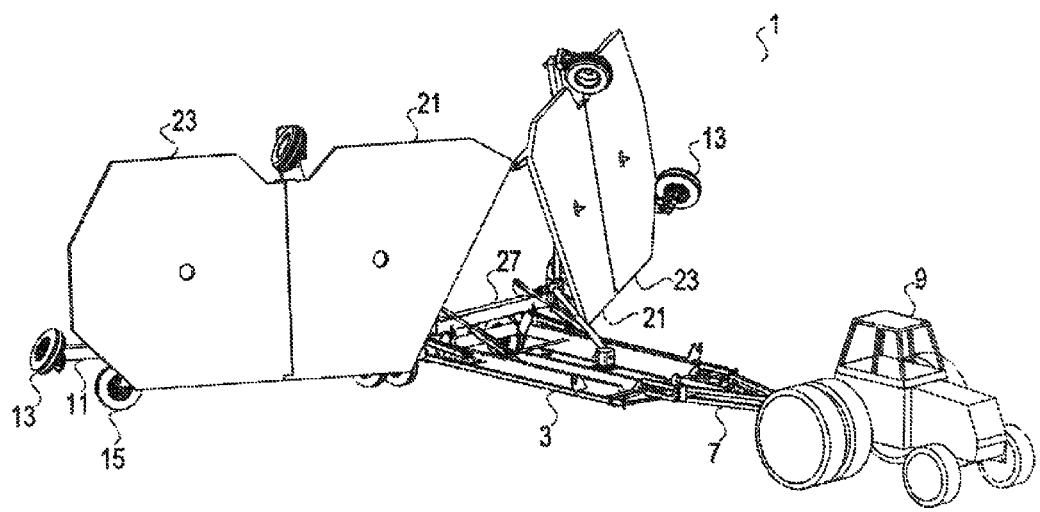
FIG. 7 is a front perspective view of the embodiment of FIG. 1 in the fully raised transport position.
Figure 8:
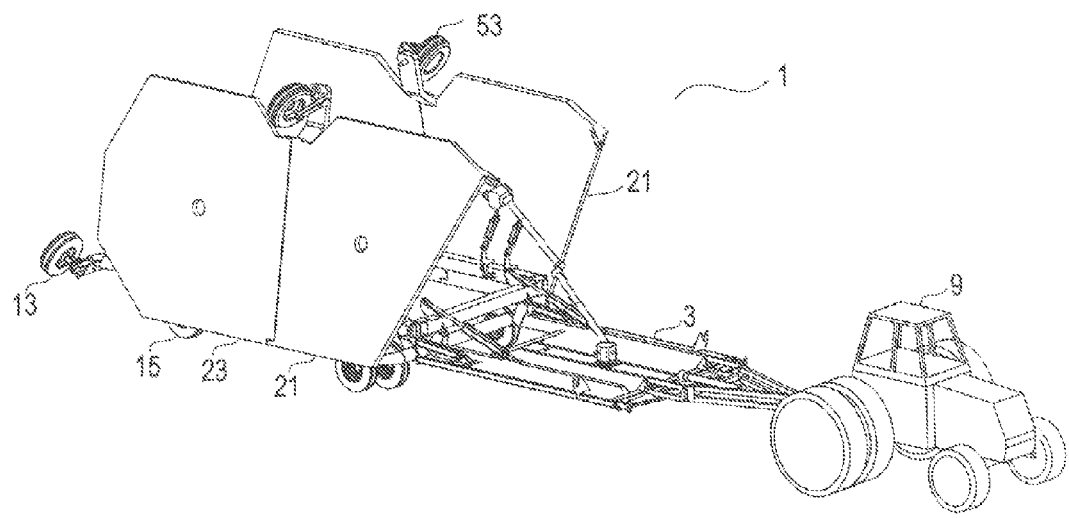
FIG. 8 is a front perspective view of the embodiment of FIG. 1 in the trailing transport position.

FIGS. 1-10 illustrate an embodiment of a rotary mower apparatus 1 of the present invention that is movable from a field position, illustrated in FIGS. 1-4, to a raised transport position illustrated in FIG. 7 and a trailing transport position illustrated in FIG. 8.

The apparatus 1 comprises a center deck 3 mounted on center wheels 5 for movement along the ground in an operating travel direction T, and a hitch 7 at a front end of the center deck 3 adapted to be attached to a towing vehicle, shown as a tractor 9.

Right and left tool bars 11R, 11L are pivotally mounted at an inner ends thereof to rear portions of the center deck 3. The tool bars 11 are movable from an extended position illustrated in FIGS. 1-7, where the tool bars 11 extend laterally outward from the center deck 3 to corresponding right and left sides of the center deck 3 and incline rearward, to a trailing position illustrated in FIG. 8 where the tool bars 11 extend rearward from the center deck 3 substantially in alignment with the operating travel direction T.

A field wheel 13 and a transport wheel 15 are mounted on outer portions of each tool bar 11. A tool bar actuator, provided in the illustrated apparatus 1 by a pair of tool bar hydraulic cylinders 17, is operative to move each tool bar 11 from the field position illustrated in FIGS. 1-4, where the transport wheel 15 is above the ground and where the field wheel 13 is on the ground oriented to roll in the operating travel direction T supporting the tool bar 11 above the ground, to the raised transport position illustrated in FIG. 7 where the field wheel 13 is above the ground and the transport wheel 15 is on the ground oriented to roll in a direction substantially parallel to a longitudinal axis TBA of the tool bar 11 supporting the tool bar 11 above the ground.

Figure 1:
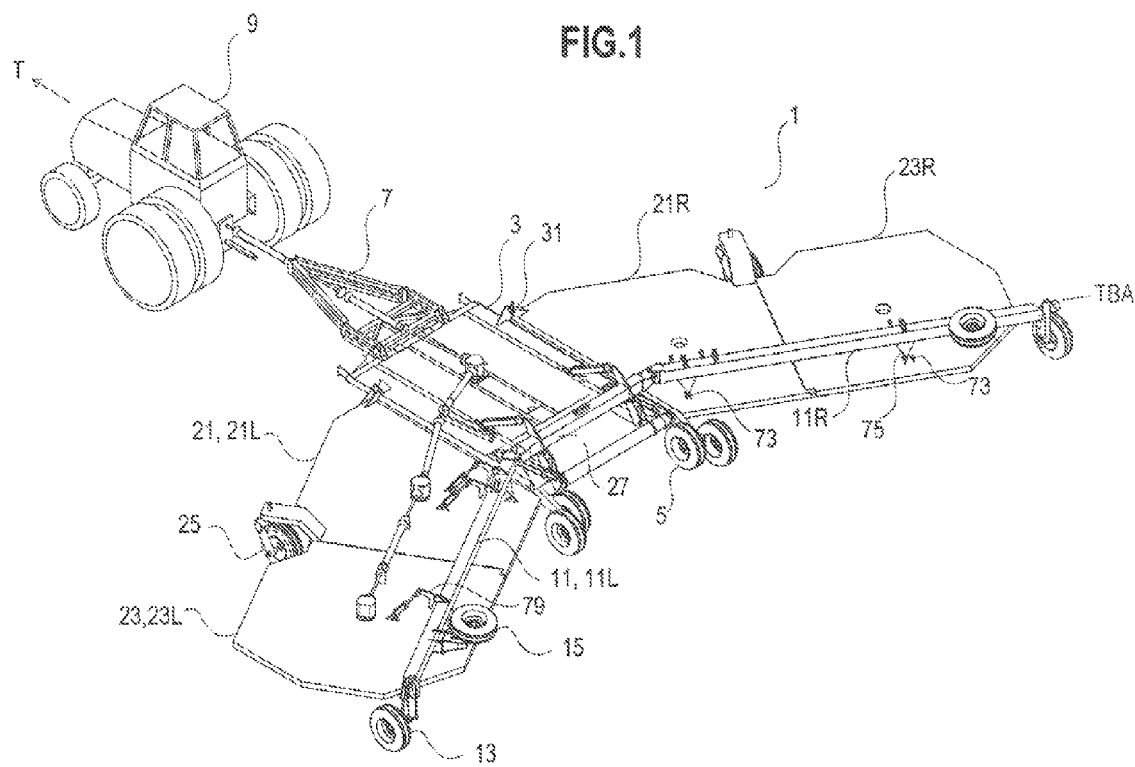
FIG. 1 is a rear perspective view of an embodiment of a rotary mower apparatus of the present invention in the field position.
Figure 2:
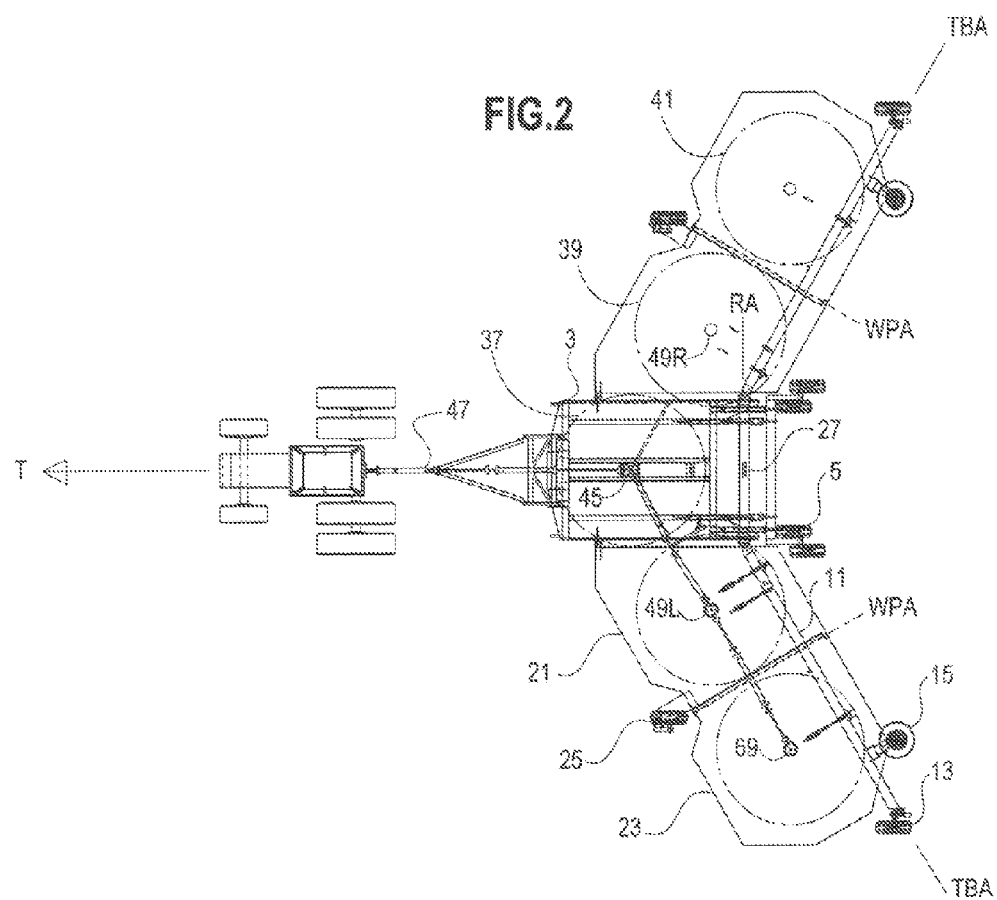
FIG. 2 is a top view of the embodiment of FIG. 1 in the field position.
Figure 3:
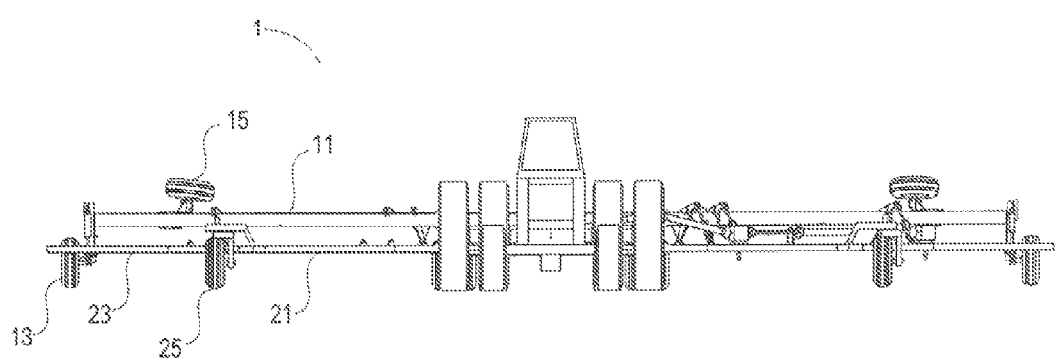
FIG. 3 is a front view of the embodiment of FIG. 1 in the field position.

Right and left inner wing decks 21R, 21L and right and left outer wing decks 23R, 23L are attached to corresponding right and left tool bars 11R, 11L. Each outer wing deck 23 is pivotally attached at an inner edge thereof to a corresponding outer edge of the corresponding inner wing deck 21 about a wing pivot axis WPA oriented substantially perpendicular to the longitudinal axis TBA of the corresponding tool bar 11, as shown in FIG. 2.

Each inner and outer wing deck 21, 23 is attached at a rear portion thereof to the corresponding tool bar 11 such that in the field position, each wing deck 21, 23 extends substantially horizontally forward from a rear end thereof located below the tool bar 11, to a front end thereof forward of the tool bar 11 and supported by a front caster wheel 25, and such that in the transport positions the wing deck 21, 23 extends upward from the tool bar 11. In the illustrated apparatus 1, the caster wheels 25 are located at the front ends of wing pivot axes WPA to allow the wings on each side to be supported and pivot about the wing pivot axes WPA as the caster wheel 25 moves up and down following uneven terrain.

In the illustrated apparatus 1 the tool bar actuator, tool bar hydraulic cylinders 17, are connected to a rock shaft 27 pivotally mounted above a rear portion of the center deck 3 about a rock shaft axis RA oriented substantially perpendicular to the operating travel direction T. Inner ends of the right and left tool bars 11R, 11L are pivotally attached to corresponding right and left ends of the rock shaft 27, and the tool bar hydraulic cylinders 17 are operative to rotate the rock shaft 27 about the rock shaft axis RA.

Figure 11:
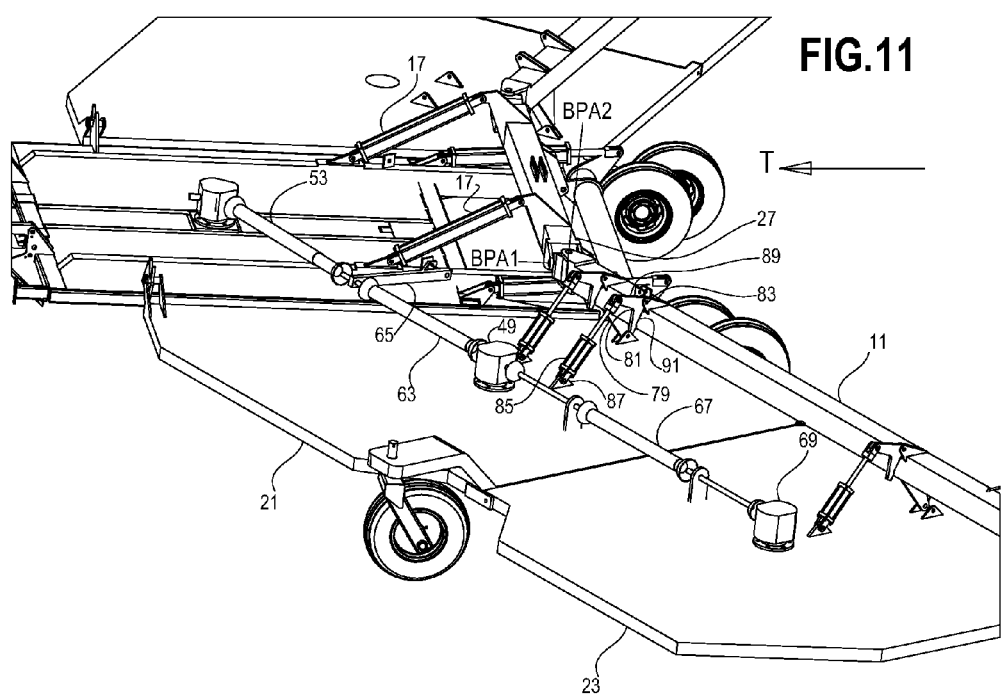
FIG. 11 is a front perspective view of the embodiment of FIG. 1 showing the drive and motion links in the field position.
Figure 14:
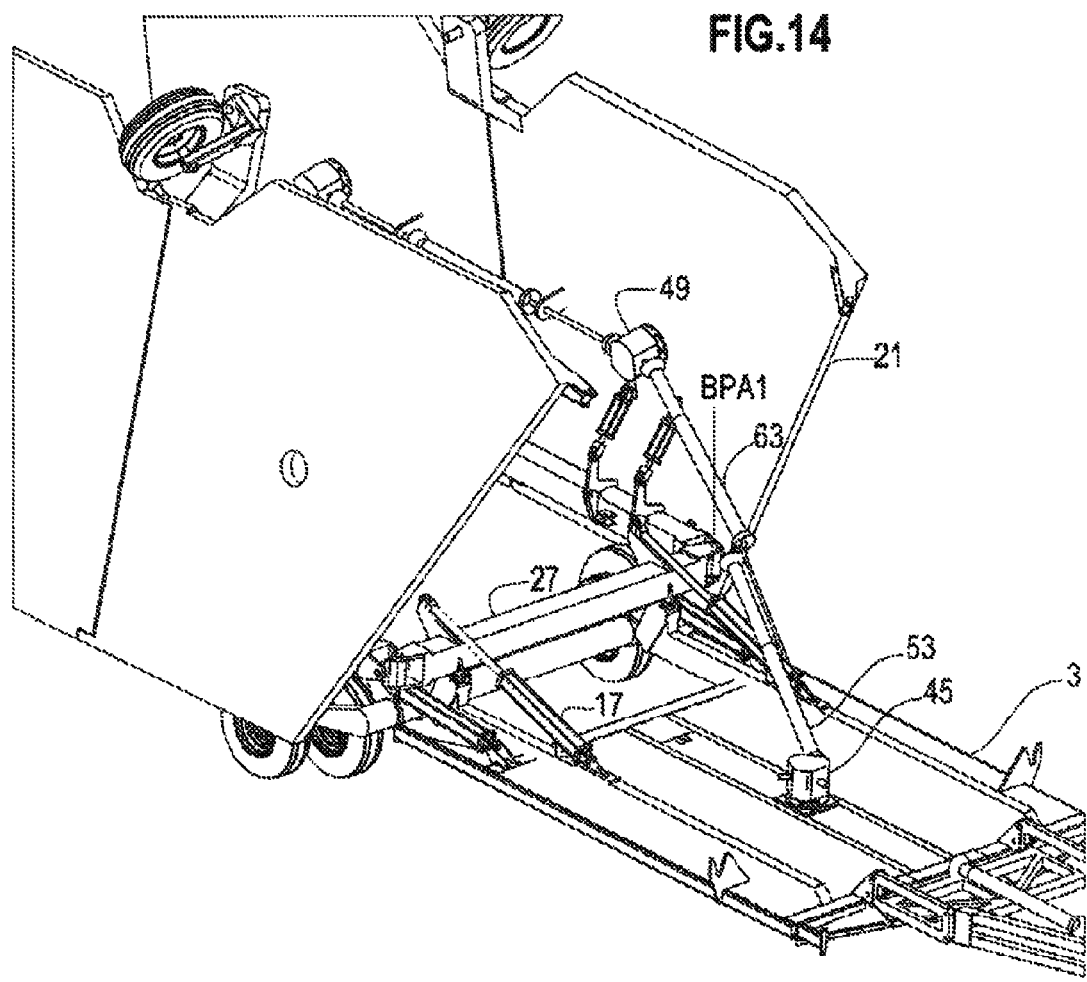
FIG. 14 is a front perspective view of the embodiment of FIG. 1 showing the drive and motion links in the trailing transport position.

The inner end of each tool bar 11 is pivotally attached to the corresponding end of the rock shaft 27 about a first bar pivot axis BPA1 and about a second bar pivot axis BPA2 oriented substantially perpendicular to the first bar pivot axis BPA1 as best seen in FIG. 11, and wherein the first bar pivot axis BPA1 is oriented substantially horizontally and in alignment with the operating travel direction T when in the field position shown in FIG. 11, and the first bar pivot axis BPA1 is oriented substantially vertically when in the transport position shown in FIG. 14. The two pivot axes BPA1, BPA2 allow the tool bars freedom to pivot up and down and forward and rearward as required.

The tool bars 11 thus rotate about their longitudinal axes TBA when moving between the field and raised transport positions, such that the field wheel 13 and transport wheel 15 move between positions on the ground supporting the tool bar 11 and above the ground with the other wheel supporting the tool bar 11.

Right and left wing support mechanisms 31 are mounted to front portions of the center deck 3 and right and left inner wing decks 21R, 21L. The wing support mechanisms 31 are operative in the field position of FIG. 4 to engage and pivotally connect front portions of the right and left inner wing decks 21R, 21L to corresponding front portions of the center deck 3 such that the front portions of the inner wing decks 21R, 21L are supported on the center deck 3 and can pivot up and down with respect to the center deck 3. As the front portions of the inner wing decks 21R, 21L move upward toward the raised transport position, the wing support mechanisms 31 disengage, as shown in FIG. 5 where the inner wing decks 21R, 21L have moved upward somewhat toward the raised transport position.

In the illustrated apparatus 1 the wing support mechanism 31 comprises a pivot pin 33 oriented substantially in alignment with the operating travel direction T when in the field position, and mounted on the front portion of the inner wing deck 21, and a hook 35 mounted on the center deck 3 configured to engage the pivot pin 33 mounted on the adjacent wing deck 21. Similarly the pin 33 could be mounted on the center deck 3 and the hook 35 in the inner wing deck 35, or another support mechanism could be provided that allows the decks 3, 21 to pivot with respect to each other.

As shown in FIG. 2, center blade 37 is mounted under the center deck 3, and right and left inner blades 39 and outer blades 41 are mounted under corresponding right and left inner and outer wing decks 21, 23 such that when in the field position the right and left outer blades 41 are rearward of the right and left inner blades 39, and the right and left inner blades 39 are rearward of the center blade 37 such that cutting paths of the right and left outer blades 41 overlap a cutting path of the right and left inner blades 39, and cutting paths of the right and left inner blades 39 overlap a cutting path of the center blade 37.

In contrast to conventional mowers where blades are about six feet in diameter, in the illustrated apparatus 1, the blades 37, 39, 41 are each about ten feet in diameter, making up about a 50 foot wide mower. Using larger diameter blades reduces the number of blades required, and thus significantly reduces the complexity of the required drive.

A drive is operative to rotate the center blade and the right and left inner and outer blades. In the illustrated apparatus 1, the drive comprises a main gearbox 45 mounted on the center deck 3 and connected to a rotating power source on the tractor 7 by a power take off shaft 47. Right and left drive shaft assemblies connect the main gearbox 45 to right and left inner wing gearboxes 49R, 49L mounted on corresponding right and left inner wing decks 21R, 21L.

In the illustrated apparatus 1, seen best in FIGS. 11-14, the drive shaft assemblies each comprise a first universal joint 51 connected to the main gearbox 45, and a first extendable drive shaft 53 connected to the first universal joint 51 at one end and to a second universal joint 55 at an opposite end thereof. A steady shaft 57 is connected at one end to the second universal joint 55 and connected at an opposite end thereof to a third universal joint 59. A fourth universal joint 61 is connected to the corresponding inner wing gearbox 49, and a second extendable drive shaft 63 is connected to the third universal joint 59 at one end and to the fourth universal joint 61 at an opposite end thereof.

A steady arm 65 is pivotally attached to the center deck 3 at a rear end thereof and is rotatably attached to the steady shaft 57 at a forward end thereof. The steady arm 65 is configured to support the first and second extendable drive shafts 53, 63 in operating alignment when in the field position illustrated in FIG. 11. As can be seen the operating alignment need not be direct straight alignment but rather alignment within the range of operation of such a pair of drive shafts connected by universal joints as illustrated.

Figure 12:
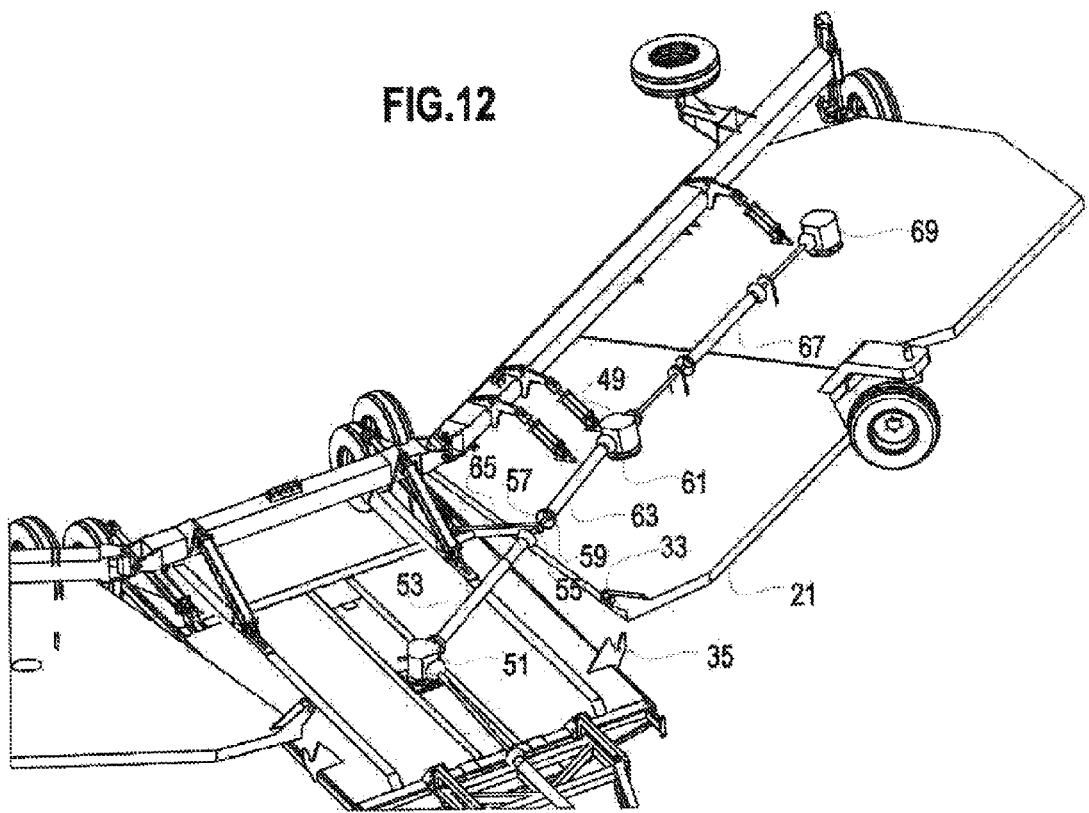
FIG. 12 is a front perspective view of the embodiment of FIG. 1 showing the drive and motion links in a partially raised position.
Figure 13:
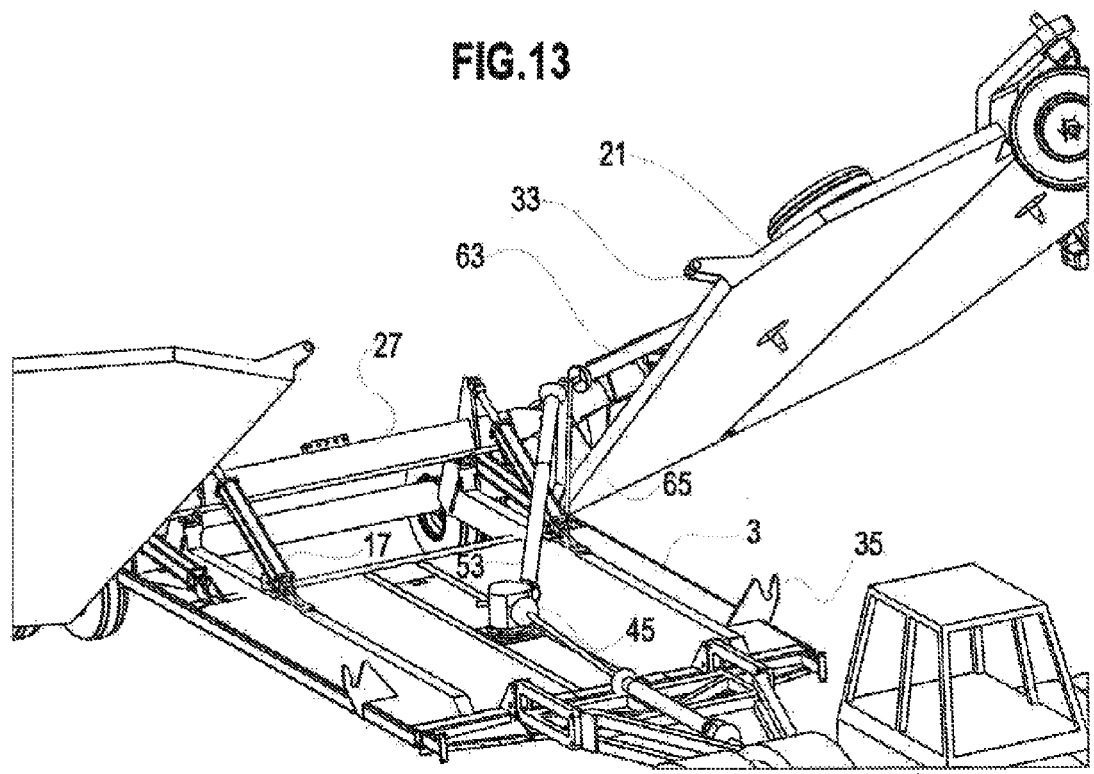
FIG. 13 is a front perspective view of the embodiment of FIG. 1 showing the drive and motion links in a further raised position compared to the partially raised position of FIG. 12.

As the wing deck 21 moves upward from the field position of FIG. 11 to the raised position of FIG. 12 on the way to the raised transport position, the steady arm 65 pivots upward from the field position and the first and second extendable drive shafts 53, 63 move out of operating alignment, through the partially raised position of FIG. 13 to the trailing transport position of FIG. 14. As the inner wing deck 21 moves upward, the first and second extendable drive shafts 53, 63 each extend while the steady arm 65 holds the steady shaft 57 in place between them and located so that when the tool bars 11 and wings 21, 23 move to the trailing transport position of FIG. 14, the first and second extendable drive shafts 53, 63 can move about the attached universal joints to achieve the required position of FIG. 14.

In the illustrated apparatus 1, the drive has a further outer drive shaft 67 connecting the inner wing gearbox 49 to the outer wing gearbox 69 mounted on the outer wing deck 23.

A cutting height actuator is operative to raise and lower the center deck 3 and inner and outer wing decks 21, 23 with respect to the ground to vary the cutting height of the blades 37, 39, 41. In the illustrated apparatus 1, the center wheels 5, field wheels 13, and caster wheels 25 are moved up and down by hydraulic cylinders to vary the cutting height.

Once the tool bars 11 and attached wing decks 21, 23 have been moved to the raised transport position of FIG. 7, the tractor 9 can move the center deck 3 forward and the tool bars 11 will pivot rearward with respect to the center deck 3 from the extended position to the trailing position of FIG. 8.

Figure 15:
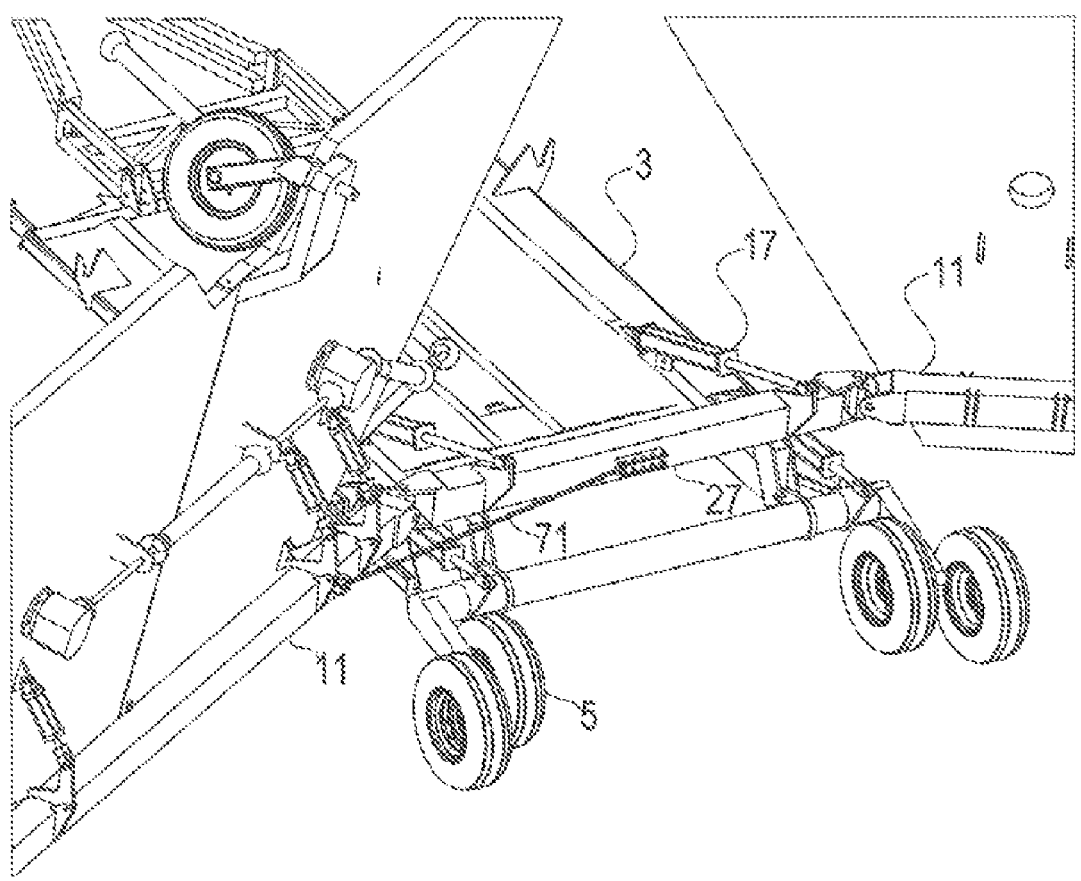
FIG. 15 is a rear perspective view of the embodiment of FIG. 1 showing the drive and motion links in the fully raised and extended transport position, and showing the restraining cable.

To move from the trailing transport position back to the extended position the center deck 3 is moved in reverse and manipulated as is known in the art to maneuver the tool bars 11 toward the extended position. A restraining cable 71, as seen in FIG. 15, is attached between each tool bar 11 and the rock shaft 27 mounted on the center deck 3 and configured such that when the tool bars 11 reach the extended position, the restraining cables 71 are tight and prevent further outward movement of the tool bars 11 beyond the desired extended position. Thus the tool bars 11 are located in the required position such that when the tool bars 11 are rotated to bring the wing decks 21, 23 down to the field position, the wing support mechanisms 31 will engage.

Figure 9:
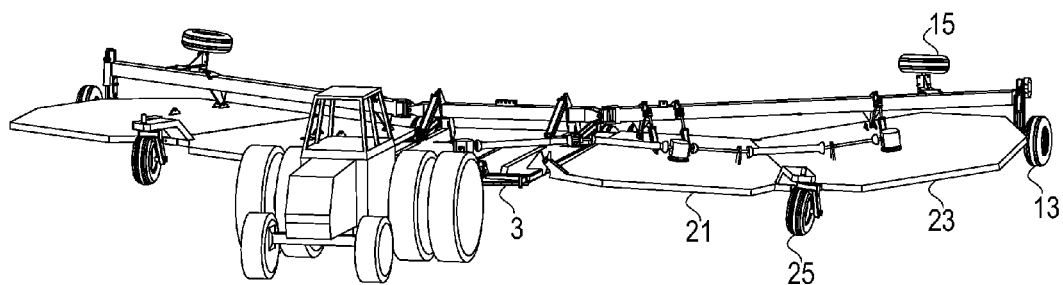
FIGS. 9 and 10 are front perspective views of the embodiment of FIG. 1 in the field position showing the inner and outer wing decks flexing to follow ground contours.
Figure 10:
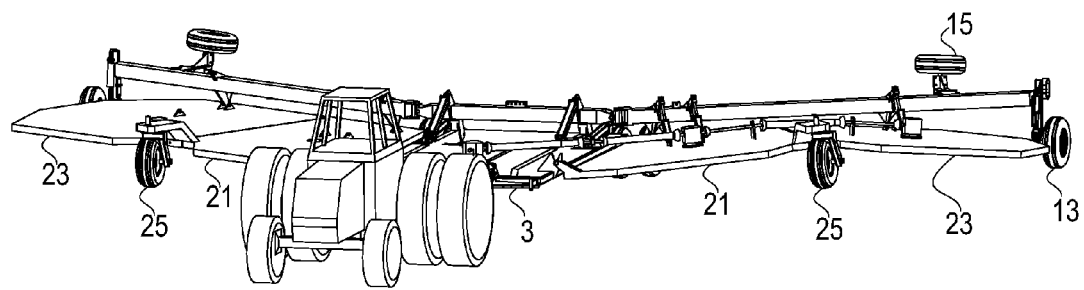

In the illustrated apparatus 1, the inner wing decks 21 and outer wing decks 23 are attached to the tool bars 11 when in the field position such that a selected attachment point 73 on the rear portion of each inner and outer wing deck 21, 23 is supported at a selected distance below the tool bars 11. Supporting each wing deck 21, 23 at the selected attachment point 73 allows lateral portions of each wing deck on each side of the attachment point 73 to flex up and down with respect to the corresponding selected attachment point 73, as shown in FIGS. 9 and 10 where portions of the decks 21, 23 to the right and left of the attachment points 73 move up and down.

Figure 16:
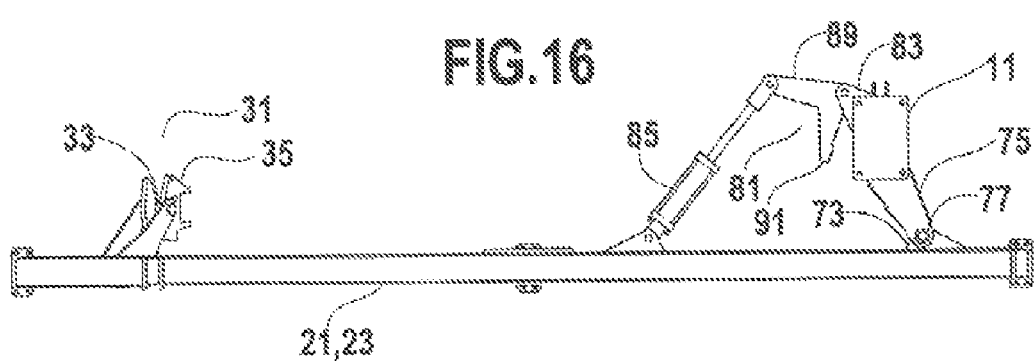
FIG. 16 is a schematic side view showing the hanger bar and a motion link in the field position.

The illustrated wing decks 21, 23 are attached to the tool bars 11 when in the field position by a hanger bar 75 that is fixedly attached at an upper end to the tool bar 11 and pivotally attached at a lower end to the selected attachment point 73. For example a ball and socket pivoting connection 77 as illustrated in FIG. 16, will allow the wing decks to flex up and down laterally with respect to the selected attachment point 73. A loose pivoting connection might also be suitable in some applications where a small pin in a large hole for example allows lateral flexing.

In order to allow flexing of the wing decks 21, 23 to follow ground contours, each inner and outer wing deck 21, 23 is linked to a corresponding tool bar 11 by at least one motion link 79. As schematically illustrated in FIGS. 16-18, each illustrated motion link 79 comprises an L-shaped link member 81 pivotally attached at a mid portion 83 thereof to a corresponding tool bar 11 and an extendable actuator 85, typically a hydraulic cylinder, pivotally connected at one end 87 to a top side of a corresponding wing deck 21, 23, and pivotally connected at an opposite end to a first arm 89 of the L-shaped link member 81.

Figure 17:
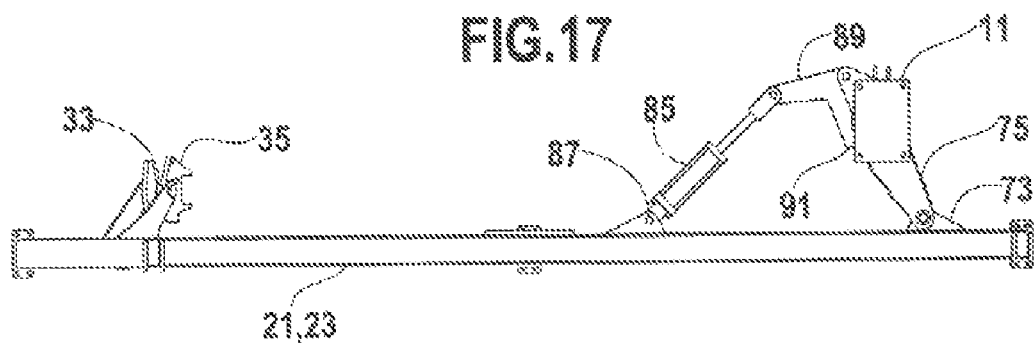
FIG. 17 is a schematic side view showing the hanger bar and a motion link in a position where the link begins to bear against the tool bar to render the wing deck rigid with respect to the tool bar.
Figure 18:
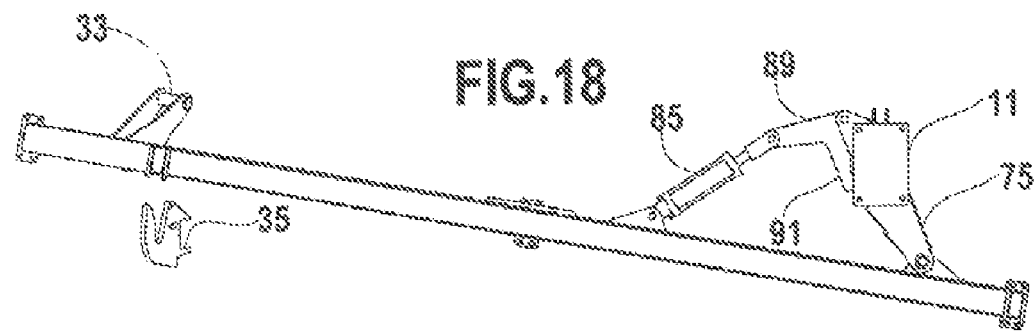
FIG. 18 is a schematic side view showing the hanger bar and a motion link in the transport position where the front of the wing deck is raised and the wing support mechanism is disengaged.

The motion link 79 is configured such that actuating the extendable actuator 85 in a first direction, illustrated as a retracted position, moves the motion link to the transport position of FIG. 17 and causes a second arm 91 of the L-shaped link member 81 to bear against the corresponding tool bar 11. Actuating the extendable actuator 85 in an opposite second direction, illustrated as an extended position, moves the motion link 79 to the field position and causes the second arm 91 of the L-shaped link member to move away from the corresponding tool bar 11 as illustrated in FIG. 16.

In the field position of the motion link 79 where the second arm 91 of the L-shaped link member 81 is moved away from the tool bar 11, each inner and outer wing deck 21, 23 is free to move relative to the corresponding tool bar 11 and thus follow ground contours.

With the motion link 79 in the transport position, each inner and outer wing deck 21, 23 is held substantially rigid with respect to corresponding tool bars 11 so that when the tool bars rotate, the wing decks 21, 23 will rotate with them. Retracting the extendable actuator 85 somewhat further from the position of FIG. 17 where the second arm 91 of the L-shaped link member 81 begins to bear against the corresponding tool bar 11, to the fully retracted position of FIG. 18 causes the front end of the wing deck 21 or 23 to move upward somewhat, about ten degrees in the illustrated apparatus 1. When this happens, the pivot pin 33 moves up out of engagement with the hook 35, disengaging the wing support mechanism 31. With this arrangement as well when the tool bar 11 rotates through 90 degrees about its longitudinal axis from the field position to the raised transport position, the wing decks 21, 23 come to a position that is five degrees past vertical, somewhat over centered so that the risk of same falling down is reduced.

As seen in the drawings there are two laterally spaced motion links 79 connecting each inner wing deck 21 to the corresponding tool bar 11, and a single motion link 79 connecting each outer wing deck 21 to the corresponding tool bar 11. With two motion links 79, the inner deck 21 is thus held rigid at two laterally spaced points on the tool bar 11. The outer deck is also held rigid by the single motion link 79 connecting same to the tool bar 11, and by the hinged connection of the outer deck 23 to the rigidly held inner deck 21.

Figure 4:
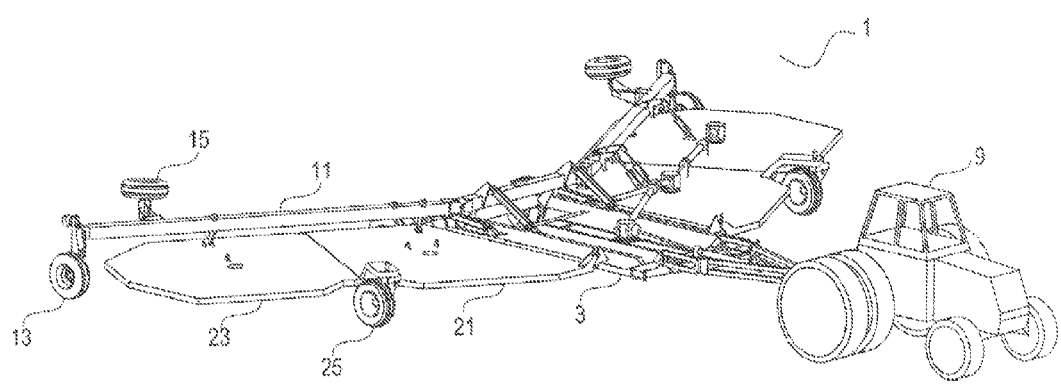
FIG. 4 is a front perspective view of the embodiment of FIG. 1 in the field position.

The movement of the mower apparatus 1 from field to trailing transport positions is illustrated in FIGS. 4-8. In FIG. 4 the apparatus 1 is shown in the field position. In FIG. 5 the extendable actuator of the motion link has been fully retracted such that the front ends of the wing decks 21 and 23 have moved upward about five degrees and the pivot pin 33 moves up out of engagement with the hook 35, disengaging the wing support mechanisms. FIG. 6 shows the apparatus 1 in an intermediate raised position showing how the field wheel 13 moves up and the transport wheel 15 moves down to support the tool bar 11. FIG. 7 shows the apparatus 1 with the wing decks 21, 23 in the fully raised transport position, at which time the tractor 9 can tow the apparatus 1 forward into the trailing transport position of FIG. 8.

It can be seen that raising the wings 21, 23 generates a torque that presses the hitch downward, such that the apparatus 1 is stable during the process of raising the wings.

Figure 19:
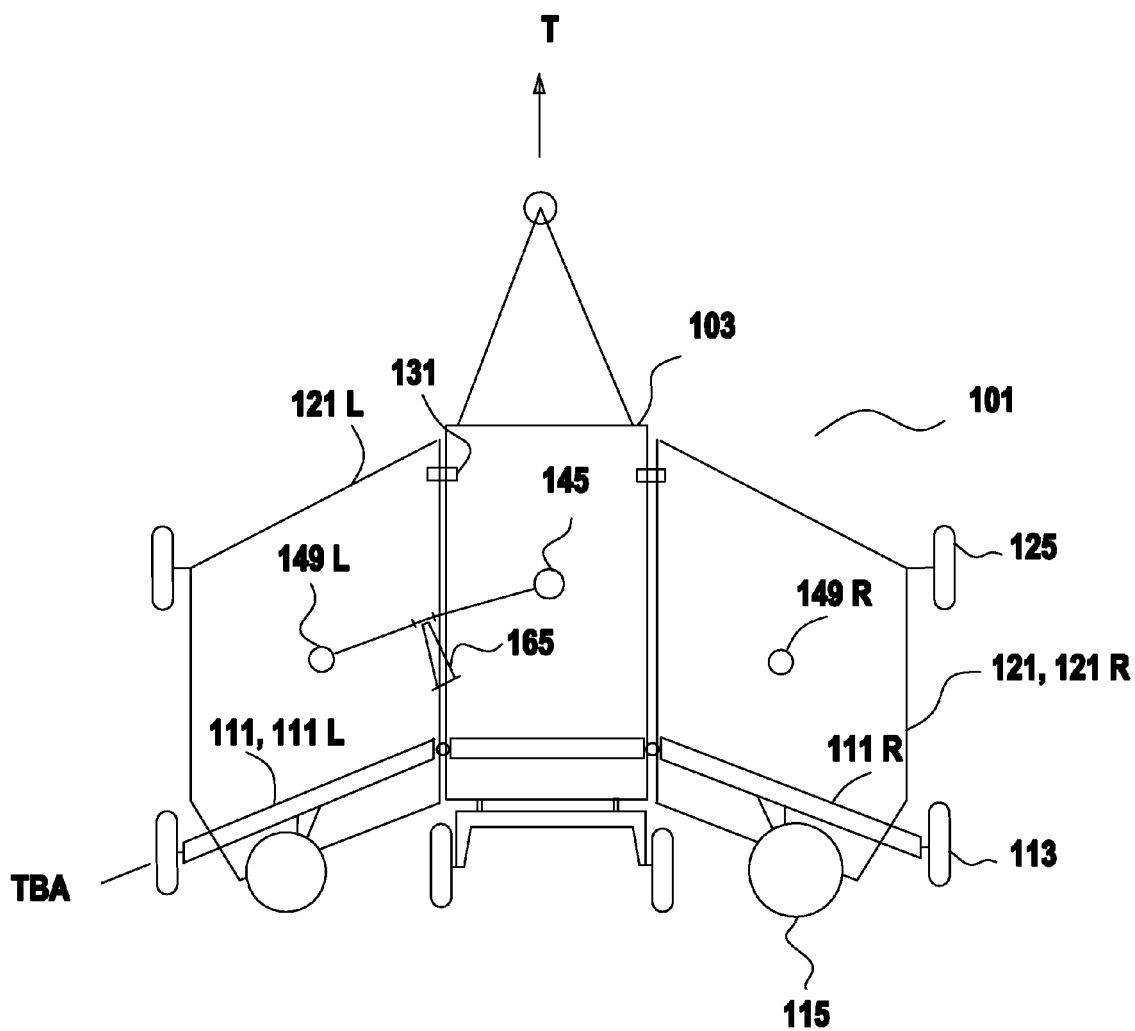
FIG. 19 is a top view of an alternate embodiment of a rotary mower apparatus of the present invention with only a single wing deck mounted to each tool bar.

FIG. 19 illustrates an alternate embodiment of a rotary mower apparatus 101 of the present invention that is movable from a field position, to a raised transport position and then a trailing transport position as above, however the apparatus 101 has only a single wing deck 121 on each side of the center deck 103. The front inner sides of the wing decks 121 are supported in the field position on the center deck 103 by wing support mechanisms 131 as described above, and on front caster wheels 125.

Right and left tool bars 111R, 111L are pivotally mounted at inner ends thereof to rear portions of the center deck 103. As above the tool bars 111 are movable from an extended position where the tool bars 111 extend laterally outward from the center deck 103 to corresponding right and left sides of the center deck 103 and incline rearward, to a trailing position where the tool bars 111 extend rearward from the center deck 103 substantially in alignment with the operating travel direction T.

As above again, field wheel 113 and a transport wheel 115 are mounted on outer portions of each tool bar 111, and a tool bar actuator is operative to move each tool bar 111 from the field position where the transport wheel 115 is above the ground and where the field wheel 113 is on the ground oriented to roll in the operating travel direction T supporting the tool bar 111 above the ground, to the raised transport position similar to that of FIG. 7 where the field wheel 113 is above the ground and the transport wheel 115 is on the ground oriented to roll in a direction substantially parallel to a longitudinal axis TBA of the tool bar 111 supporting the tool bar 111 above the ground. The tool bars 111 pivot back to the trailing position as described with respect to the above embodiments.

Right and left drive shaft assemblies with a steady arm 165 as described above connect the main gearbox 145 to right and left inner wing gearboxes 149R, 149L mounted on corresponding right and left inner wing decks 121R, 121L, so that the wing decks 121 can move up to the transport position and then rearward to the trailing position.

Since the wing decks 121 are pivotally attached to the center deck at the wing support mechanisms 131 and the tool bars 111 are able to pivot up and down as the field wheel 113 and caster wheel 125 move up and down in uneven terrain, the wing decks 121 can be simply attached generally rigidly with respect to the tool bar 111 without the need for the hangers and motion links of the above apparatus with inner and outer wing decks.

Figure 20:
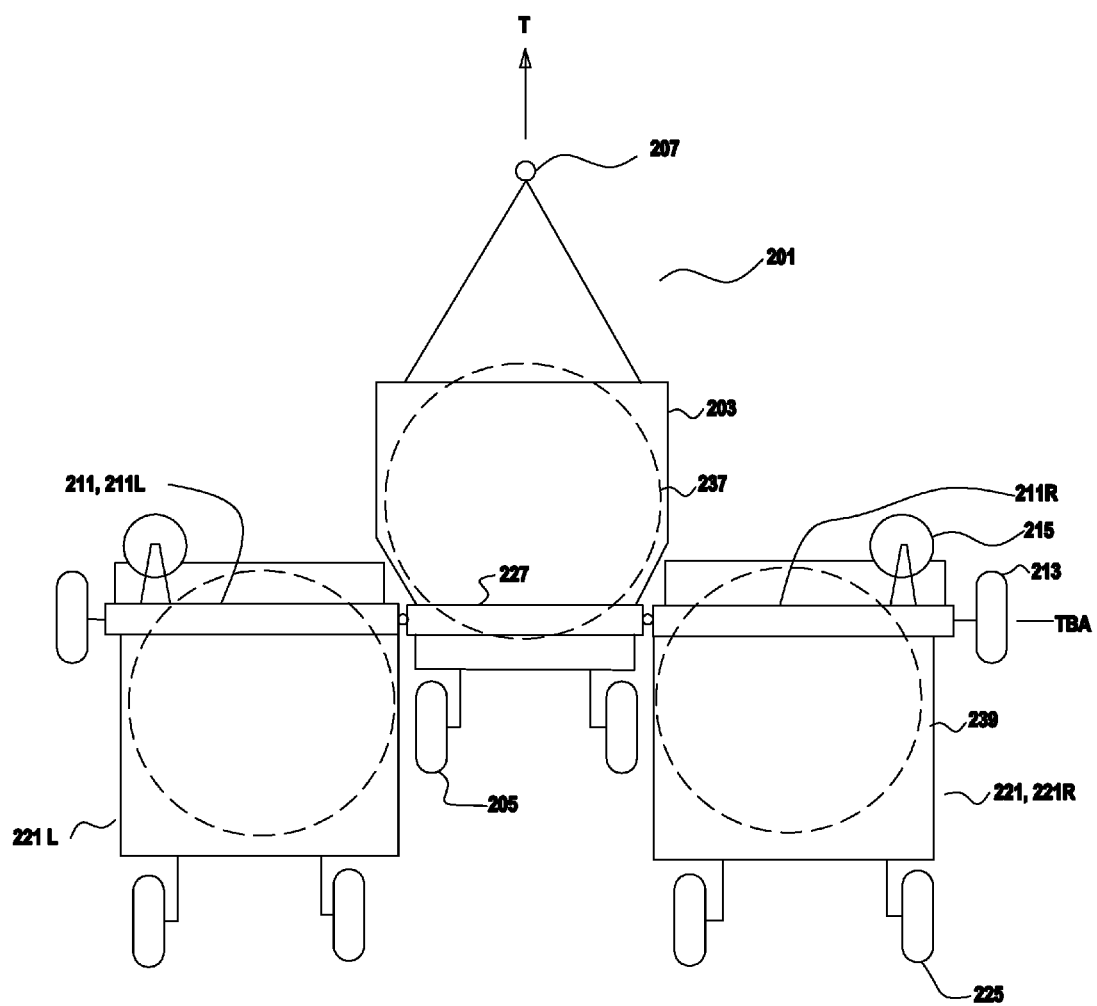
FIG. 20 is a top view of a further alternate embodiment of a rotary mower apparatus of the present invention with a single wing deck mounted to each tool bar, and where the wing decks extend rearward from the tool bars.

FIG. 20 schematically illustrates a further alternate embodiment of a rotary mower apparatus 201 of the present invention that is movable from a field position, to a transport position and then a trailing transport position as above. As in the apparatus 101 of FIG. 19, the apparatus 201 of FIG. 20 has only a single wing deck 221 on each side of the center deck 203, however in contrast the tool bars 211 are not inclined rearward but extend laterally substantially perpendicular to the operating travel direction, and the wing decks 221 extend rearward from the tool bars 211 instead of forward as in the embodiments described above.

The apparatus 201 comprises a center deck 203 with a hitch 207 and mounted on center wheels 205. Right and left tool bars 211R, 211L are pivotally mounted at an inner ends thereof to a rockshaft 227 mounted on a rear portion of the center deck 203. The tool bars 211 are movable from the illustrated extended position, where the tool bars extend laterally outward from the center deck 203 to corresponding right and left sides of the center deck, to a trailing position, not illustrated but substantially as described with respect to the embodiments above, where the tool bars 211 extend rearward from the center deck 203 substantially in alignment with the operating travel direction T. A field wheel 213 and a transport wheel 215 are mounted on outer portions of each tool bar 211, and a tool bar actuator is operative to move each tool bar 211 from the field position, where the transport wheel 215 is above the ground and where the field wheel 213 is on the ground oriented to roll in the operating travel direction T supporting the tool bar 211 above the ground, to the transport position where the field wheel 213 is above the ground and the transport wheel 215 is on the ground oriented to roll in a direction substantially parallel to a longitudinal axis TBA of the tool bar 211 supporting the tool bar above the ground.

Right and left wing decks 221R, 221L are each attached to a corresponding tool bar 211R, 211L such that in the field position, each wing deck is oriented substantially horizontally and supported by wing wheels 225 mounted at a rear end of the deck. As in the apparatus 101 of FIG. 19, each tool bars 211 is able to pivot up and down as the field wheel 213 and wing wheels 225 move up and down in uneven terrain, the wing decks 221 can be simply attached generally rigidly with respect to the tool bar 211 without the need for the hangers and motion links of the above apparatus with inner and outer wing decks.

In the apparatus 201, the right and left wing decks 221R, 221L are attached at front portions thereof to corresponding tool bars 211R, 211L such that in the field position illustrated in FIG. 20, the wing decks 221 extend substantially horizontally rearward from a front end thereof located below the tool bar 211, to a rear end thereof rearward of the tool bar 211 and supported by wing wheels 225. The transport wheels 215 are mounted on the front of the tool bars 211 and the tool bar actuator in this embodiment is operative rotate the rockshaft in the opposite direction to that described above such that the rear ends of the wing decks 221 move up to the transport position where each wing deck 221 extends upward from the corresponding tool bar 221 so that the tool bars 211 can pivot back to the trailing position as described with respect to the above embodiments.

A center blade 237 is mounted under the center deck 203, and right and left blades 239 are mounted under corresponding right and left wing decks 221 such that when in the field position, the right and left blades 239 are oriented such that cutting paths of the right and left blades 239 overlap a cutting path of the center blade 237.

A drive is operative to rotate the center, right, and left blades 237, 239. It is contemplated a similar drive to that described above comprising gearboxes and drive shafts could be configured to provide the drive, or alternatively hydraulic motor drives such as are known in the art could provide the drive.

A cutting height actuator operative to raise and lower the center deck and right and left wing decks with respect to the ground could comprise hydraulic cylinders on the center, field, and wing wheels 205, 213, 225.

Figure 21:
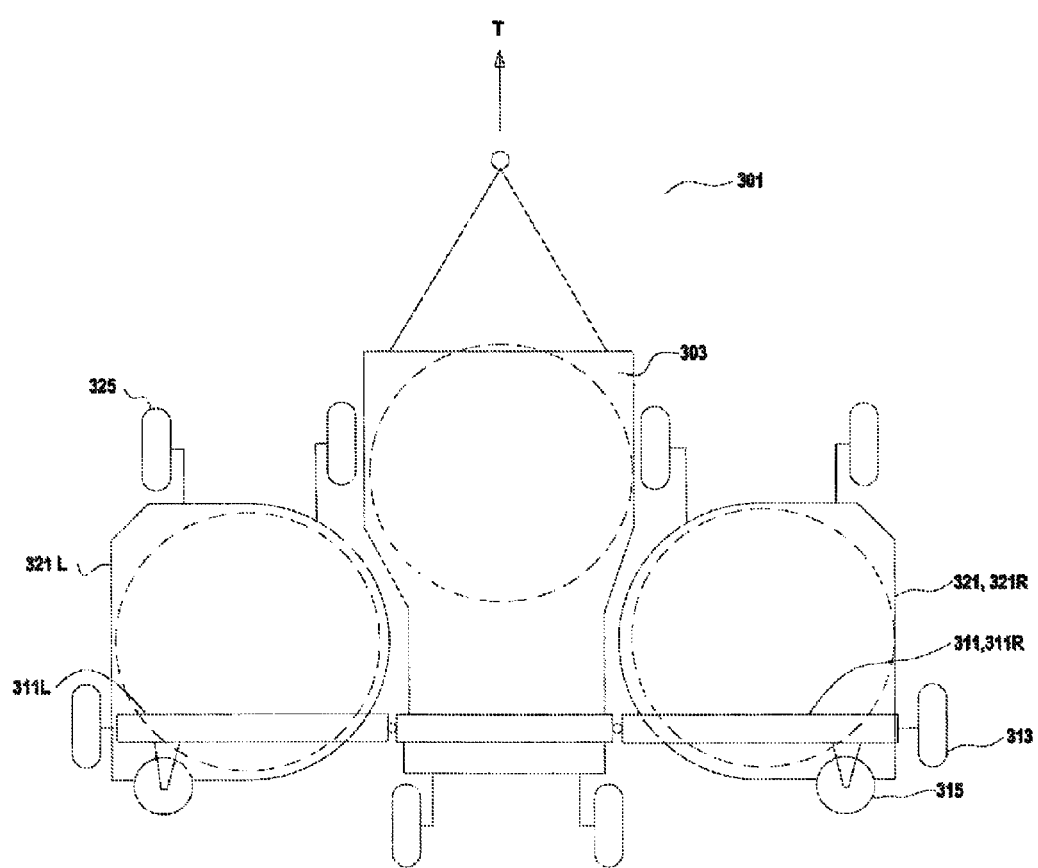
FIG. 21 is a top view of another further alternate embodiment of a rotary mower apparatus of the present invention with a single wing deck mounted to each tool bar, and where the wing decks extend forward from the tool bars, and where front ends thereof are supported by a pair of caster wheels

FIG. 21 schematically illustrates a still further alternate embodiment of an apparatus 301 of the present invention where the tool bars 311 are not inclined rearward but extend laterally substantially perpendicular to the operating travel direction T, and where the right and left wing decks 321R, 321L are attached at rear portions thereof to corresponding tool bars 311R, 311L such that in the field position illustrated in FIG. 21 the wing decks 321 extend substantially horizontally forward from a rear end thereof located below the tool bars 311, to a front end thereof forward of the tool bars 311 and supported by front caster wing wheels 325. In the apparatus 301 the front inner sides of the wing decks 321 are not supported on the center deck 303 but instead a pair of castering front wing wheels 325 on each wing support the front of the wings and allow same to move up and down to follow ground contours. The field and transport wheels 313, 315 operate as above.

Thus the rotary mower apparatus 1, 101, 201, 301 of the present invention is movable from a field position to a raised transport position, and from the raised transport position to a trailing transport position. In its basic form the apparatus comprises a center deck 3, 103, 203, 303, mounted on center wheels for movement along the ground in an operating travel direction, and a hitch at a front end of the center deck adapted to be attached to a towing vehicle. Right and left wing decks 21, 121, 221, 321 are movably attached on corresponding right and left sides of the center deck such that in the field position, each wing deck is oriented substantially horizontally and extends laterally from the center deck, and such that in the raised transport position each wing deck extends upward and extends laterally from the center deck, and such that in the trailing transport position each wing deck extends upward and rearward from the center deck. A wing lift actuator is operative to move each wing deck from the field position to the raised transport position. A transport wheel 15, 115, 215, 315 and a field wheel 13, 113, 213, 313, are mounted on each side of the center deck, and in the field position, the transport wheel is above the ground and the field wheel is on the ground oriented to roll in the operating travel direction supporting the wing deck above the ground, and in the raised transport position the field wheel is above the ground and the transport wheel is on the ground oriented to roll in a direction transverse to the operating travel direction and supporting the wing deck above the ground A wing wheel 25, 125, 225, 325, is mounted such that in the field position, the wing wheel is on the ground supporting the wing deck above the ground, and such that in the raised transport position the wing wheel is above the ground. A center blade is mounted under the center deck, and right and left blades mounted under corresponding right and left wing decks such that when in the field position the right and left blades are oriented such that cutting paths of the right and left blades overlap a cutting path of the center blade, and a drive is operative to rotate the center, right, and left blades. A cutting height actuator is operative to raise and lower the center deck and right and left wing decks with respect to the ground. As the center deck is towed forward in the raised transport position, the wing decks pivot rearward with respect to the center deck from the raised transport position to the trailing transport position.

The embodiments of the of the present invention illustrated above use a tool bar to mount either one or two wing decks on either side of the center deck. FIG. 22 schematically illustrates a further embodiment of the rotary mower apparatus 401 which does not use a tool bar to mount the wings.

The apparatus 401 comprises, as do the embodiments described above, a center deck 403 mounted on center wheels 405 and a hitch 407 at a front end of the center deck adapted to be attached to a towing vehicle. Right and left inner wing decks 421R, 421L are movably attached on corresponding right and left sides of the center deck 403 and right and left outer wing decks 423R, 423L are pivotally attached at an inner edge thereof to an outer edge of the corresponding inner wing decks 421R, 421L about a wing pivot axis WPA.

In the field position illustrated in FIG. 22, each wing deck 421, 423 is oriented substantially horizontally and extends laterally from the center deck. In the raised transport position, not illustrated but analogous to the embodiments described above, each wing deck 421, 423 extends upward and extends laterally from the center deck 403, and in the trailing transport position, also not illustrated, each wing deck extends upward and rearward from the center deck.

A wing lift actuator is operative to move the wing decks from the field position to the raised transport position. In the illustrated apparatus 401 the wing lift actuator comprises an extendable actuator 417, typically a hydraulic cylinder, pivotally mounted at one end to the center deck 403 and pivotally mounted at an opposite end to the inner wing deck 421. In the field position the extendable actuator 417 floats, extending and retracting as required to allow the wing decks 421 to move with respect to the center deck 403.

A transport wheel 415 and a field wheel 413 are located on each side of the center deck 403 and are mounted directly to the wing decks instead of to a tool bar. As in the embodiments above, in the field position the transport wheel 415 is above the ground and the field wheel 413 is on the ground oriented to roll in the operating travel direction T supporting the wing deck 421 above the ground, and in the raised transport position, the field wheel 413 is above the ground and the transport wheel 415 is on the ground oriented to roll in a direction transverse to the operating travel direction T and supporting the wing deck above the ground, as described with respect to the embodiments above.

A wing wheel 425 is also mounted to the wing such that in the field position, the wing wheel 425 is on the ground supporting the wing deck above the ground, and in the raised transport position the wing wheel 425 is above the ground. As described above, as the center deck 403 is towed forward in the raised transport position, the wing decks 421 pivot rearward with respect to the center deck from the raised transport position to the trailing transport position.

A center blade and right and left inner and outer blades are mounted under corresponding decks, and a drive, such as is described above, is operative to rotate the blades. Although the above embodiments are shown with a single blade under each mower deck it is contemplated that more than one blade can be used under each deck, as is known in the prior art. Similarly it is contemplated that a tandem wheel assembly could be used where the above shows a single wheel in a location.

In the illustrated apparatus 401 each inner wing 421 is pivotally attached at a rear end thereof to the center deck about a first joint pivot axis JPA1 and about a second joint pivot axis JPA2 oriented substantially perpendicular to the first joint pivot axis. The first joint pivot axis JPA1 is oriented substantially horizontally and in alignment with the operating travel direction T when in the field position shown in FIG. 22, and is oriented substantially vertically when in the transport positions. A universal joint 420 can conveniently be used to provide the pivotal mounting about the two axes JPA1, JPA2.

Right and left wing support mechanisms 431 are mounted to front portions of the center deck 403 and right and left inner wing decks. The wing support mechanisms 431 are operative in the field position to engage and pivotally connect front portions of the right and left inner wing decks 421R, 421L to corresponding front portions of the center deck 403 such that the front portions of the inner wing decks 421 are supported on the center deck 403 and can pivot up and down with respect to the center deck 403. The front portions of the inner wing decks 421 move upward to the raised transport position and disengage the wing support mechanisms.

The wing support mechanisms 431 provide a front pivot axis FA that is substantially aligned with the first joint pivot axis JPA1 when the apparatus 401 is in the field position in order that the wing can pivot up and down with respect to the center deck 403.

On each right and left side, an inner field wheel 413A is mounted to a rear end of one of the inner and outer wing decks 421, 423 in proximity to the wing pivot axis WPA, and an outer field wheel 413B is mounted to an outer portion of the outer wing deck 423. The wing wheel 425 is mounted to a front end of one of the inner and outer wing decks in proximity to the wing pivot axis and the transport wheel 415 is mounted to a rear portion of the outer wing deck 423. A further wing wheel 425A can be provided farther out on the outer wing 423.

On each right and left side, a releasable wing lock, conveniently provided by a hydraulic cylinder 481, is operative to lock the inner and outer wing decks 421, 423 into a substantially fixed position with respect to each other when in a transport configuration, and is operative to allow the inner and outer wings 421, 423 to pivot with respect to each other about the wing pivot axis WPA when in the field position.

In the embodiment of FIGS. 1-18 described above, the inner and outer wings 421, 423 are locked to the tool bar to fix same with respect to each other for transport. In the apparatus 401 they are directly locked into a substantially fixed relationship by the releasable wing lock.

Thus the rotary mower of the present invention can be used in a wide variety of different mower configurations.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A rotary mower apparatus movable from a field position to a raised transport position, and from the raised transport position to a trailing transport position, the apparatus comprising:

a center deck mounted on center wheels for movement along the ground in an operating travel direction, and a hitch at a front end of the center deck adapted to be attached to a towing vehicle;

right and left wing decks, each wing deck movably attached on corresponding right and left sides of the center deck such that in the field position, each wing deck is oriented substantially horizontally and extends laterally from the center deck, and such that in the raised transport position each wing deck extends upward and extends laterally from the center deck, and such that in the trailing transport position each wing deck extends upward and rearward from the center deck;

a wing lift actuator operative to move each wing deck from the field position to the raised transport position;

a transport wheel and a field wheel attached to one of the right or left wing deck on each side of the center deck, wherein in the field position, the transport wheel is above the ground and the field wheel is on the ground oriented to roll in the operating travel direction supporting the wing deck above the ground, and wherein in the raised transport position the field wheel is above the ground and the transport wheel is on the ground oriented to roll in a direction transverse to the operating travel direction and supporting the wing deck above the ground;

a wing wheel mounted such that in the field position, the wing wheel is on the ground supporting a wing deck above the ground, and such that in the raised transport position the wing wheel is above the ground;

a center blade mounted under the center deck, and right and left blades mounted under corresponding right and left wing decks such that when in the field position the right and left blades are oriented such that cutting paths of the right and left blades overlap a cutting path of the center blade;

a drive operative to rotate the center, right, and left blades; and a cutting height actuator operative to raise and lower the center deck and right and left wing decks with respect to the ground;

wherein, as the center deck is towed forward in the raised transport position, the wing decks pivot rearward with respect to the center deck from the raised transport position to the trailing transport position.

2. The apparatus of claim 1 wherein the wing lift actuator comprises an extendable actuator pivotally mounted at one end to the center deck and pivotally mounted at an opposite end to the wing deck, and wherein in the field position the extendable actuator floats to allow the wing decks to move with respect to the center deck.

3. The apparatus of claim 2 wherein each wing is pivotally attached at a rear end thereof to the center deck about a first pivot axis and about a second pivot axis oriented substantially perpendicular to the first pivot axis, and wherein the first pivot axis is oriented substantially horizontally and in alignment with the operating travel direction when in the field position, and the first pivot axis is oriented substantially vertically when in the transport positions.

4. The apparatus of claim 3 comprising right and left wing support mechanisms mounted to front portions of the center deck and right and left wing decks, the wing support mechanisms operative in the field position to engage and pivotally connect front portions of the right and left wing decks to corresponding front portions of the center deck such that the front portions of the wing decks are supported on the center deck and can pivot up and down with respect to the center deck, and wherein the front portions of the wing decks move upward to the raised transport position and disengage the wing support mechanisms.

5. The apparatus of claim 4 wherein the right and left wing decks are right and left inner wing decks and further comprising:

right and left outer wing decks, each outer wing deck pivotally attached at an inner edge thereof to an outer edge of the corresponding inner wing deck about a wing pivot axis, and right and left outer blades mounted under the right and left outer wing decks;

wherein the decks are configured such that when in the field position the right and left outer blades are rearward of the right and left inner blades, and the right and left inner blades are rearward of the center blade such that cutting paths of the right and left outer blades overlap a cutting path of the right and left inner blades, and cutting paths of the right and left inner blades overlap a cutting path of the center blade, and wherein the drive is operative to rotate the outer blades;

another field wheel mounted to a rear end of one of the inner and outer wing decks on each right and left side, and wherein the wing wheel is mounted to a front end of one of the inner and outer wings in proximity to the wing pivot axis and the transport wheel is mounted to a rear portion of the outer wing deck; and on each right and left side, a releasable wing lock operative to lock the inner and outer wing decks into a substantially fixed position with respect to each other when in a transport configuration, and operative to allow the inner and outer wing decks to pivot with respect to each other about the wing pivot axis when in the field position.

6. The apparatus of claim 1 wherein the wing lift actuator comprises a rock shaft pivotally mounted to the center deck above the center deck about a rock shaft axis oriented substantially perpendicular to the operating travel direction, and wherein right and left ends of the rock shaft are connected to corresponding right and left wing mounting members attached to corresponding right and left wing decks, and wherein the wing lift actuator is operative to rotate the rock shaft about the rock shaft axis.

7. The apparatus of claim 6 wherein each wing mounting member is pivotally attached to the corresponding end of the rock shaft about a first pivot axis and about a second pivot axis oriented substantially perpendicular to the first pivot axis, and wherein the first pivot axis is oriented substantially horizontally and in alignment with the operating travel direction when in the field position, and the first pivot axis is oriented substantially vertically when in the transport positions.

8. The apparatus of claim 7 wherein the right and left wing mounting members are provided by right and left tool bars pivotally mounted at inner ends thereof to the corresponding end of the rock shaft and movable from an extended position, where the tool bars extend laterally outward and rearward from the center deck to corresponding right and left sides of the center deck, to a trailing position where the tool bars extend rearward from the center deck substantially in alignment with the operating travel direction;

wherein the field wheels and transport wheels are mounted on outer portions of corresponding tool bars;

wherein each wing deck is attached at a rear portion thereof to a corresponding tool bar such that in the field position, the wing deck extends substantially horizontally forward from a rear end thereof located below the tool bar, to a front end thereof forward of the tool bar and supported by the wing wheel, and such that in the transport positions the wing deck extends upward from the tool bar.

9. The apparatus of claim 8 wherein the right and left wing decks are right and left inner wing decks and further comprising right and left outer wing decks, each outer wing deck attached at a rear portion thereof to a corresponding tool bar such that in the field position, the outer wing deck extends substantially horizontally forward from a rear end thereof located below the tool bar, to a front end thereof forward of the tool bar, and such that in the transport positions the outer wing deck extends upward from the tool bar;

wherein each outer wing deck is pivotally attached at an inner edge thereof to an outer edge of the corresponding inner wing deck about a wing pivot axis oriented substantially perpendicular to the longitudinal axis of the corresponding tool bar.

10. The apparatus of claim 9 wherein the inner wing decks and outer wing decks are attached to the tool bars when in the field position such that a selected attachment point on the rear portion of each inner and outer wing deck is supported at a selected distance below the tool bars, and such that lateral portions of each inner and outer wing deck on each side of the attachment point can flex up and down with respect to the attachment point.

11. The apparatus of claim 10 wherein the inner wing decks and outer wing decks are attached to the tool bars by a hanger bar fixedly attached at an upper end to the tool bar and pivotally attached at a lower end to the selected attachment point.

12. The apparatus of claim 11 wherein each inner and outer wing deck is linked to a corresponding tool bar by at least one motion link movable from a field position, where each inner and outer wing deck is free to move relative to the corresponding tool bar, to a transport position, where each inner and outer wing deck is held substantially rigid with respect to corresponding tool bars, and where front portions of the inner and outer wing decks are raised to a position where the wing support mechanisms are disengaged.

13. The apparatus of claim 8 wherein the right and left wing decks are attached at rear portions thereof to corresponding tool bars such that in the field position, the wing decks extend substantially horizontally forward from a rear end thereof located below the tool bar, to a front end thereof forward of the tool bar and supported by a front caster wing wheel.

14. The apparatus of claim 8 wherein the right and left wing decks are attached at front portions thereof to corresponding tool bars such that in the field position, the wing decks extend substantially horizontally rearward from a front end thereof located below the tool bar, to a rear end thereof rearward of the tool bar and supported by another wing wheel.

15. A rotary mower apparatus movable from a field position to a raised transport position, and from the raised transport position to a trailing transport position, the apparatus comprising:
 a center deck mounted on center wheels for movement along the ground in an operating travel direction, and a hitch at a front end of the center deck adapted to be attached to a towing vehicle;
 right and left tool bars pivotally mounted at an inner ends thereof to rear portions of the center deck and movable from an extended position, where the tool bars extend laterally outward from the center deck to corresponding right and left sides of the center deck and incline rearward, to a trailing transport position where the tool bars extend rearward from the center deck substantially in alignment with the operating travel direction;
 a field wheel and a transport wheel mounted on outer portions of each tool bar;
 a tool bar actuator operative to move each tool bar from the field position, where the transport wheel is above the ground and where the field wheel is on the ground oriented to roll in the operating travel direction supporting the tool bar above the ground, to the raised transport position where the field wheel is above the ground and the transport wheel is on the ground oriented to roll in a direction substantially parallel to a longitudinal axis of the tool bar supporting the tool bar above the ground;
 right and left wing decks, each wing deck attached at a rear portion thereof to a corresponding tool bar such that in the field position, the wing deck extends substantially horizontally forward from a rear end thereof located below the tool bar, to a front end thereof forward of the tool bar and supported by a front caster wheel, and such that in the transport positions the wing deck extends upward from the tool bar;
 right and left wing support mechanisms mounted to front portions of the center deck and right and left wing decks, the wing support mechanisms operative in the field position to engage and pivotally connect front portions of the right and left wing decks to corresponding front portions of the center deck such that the front portions of the wing decks are supported on the center deck and can pivot up and down with respect to the center deck, and wherein when the front portions of the wing decks move upward to the raised transport position, the wing support mechanisms disengage;
 a center blade mounted under the center deck, and right and left blades mounted under corresponding right and left wing decks such that when in the field position the right and left blades are rearward of the center blade such that cutting paths of the right and left blades overlap a cutting path of the center blade;
 a drive operative to rotate the center, right, and left blades; and
 a cutting height actuator operative to raise and lower the center deck and right and left wing decks with respect to the ground;
 wherein, as the center deck is towed forward in the raised transport position, the tool bars pivot rearward with respect to the center deck from the extended position to the trailing transport position.

16. The apparatus of claim 15 comprising a rock shaft pivotally mounted above a rear portion of the center deck about a rock shaft axis oriented substantially perpendicular to the operating travel direction, and wherein inner ends of the right and left tool bars are pivotally attached to corresponding right and left ends of the rock shaft, and wherein the tool bar actuator is operative to rotate the rock shaft about the rock shaft axis.

17. The apparatus of claim 16 wherein the inner end of each tool bar is pivotally attached to the corresponding end of the rock shaft about a first pivot axis and about a second pivot axis oriented substantially perpendicular to the first pivot axis, and wherein the first pivot axis is oriented substantially horizontally and in alignment with the operating travel direction when in the field position, and the first pivot axis is oriented substantially vertically when in the transport positions.

18. The apparatus of claim 15 wherein the drive comprises a main gearbox mounted on the center deck and adapted for connection to a rotating power source on an attached towing vehicle, and right and left drive shaft assemblies connecting the main gearbox to right and left wing gearboxes mounted on corresponding right and left wing decks, wherein at least one drive shaft assembly comprises:
 a first universal joint connected to the main gearbox;
 a first extendable drive shaft connected to the first universal joint at one end and to a second universal joint at an opposite end thereof;
 a steady shaft connected at one end to the second universal joint and connected at an opposite end thereof to a third universal joint;
 a fourth universal joint connected to the corresponding wing gearbox;
 a second extendable drive shaft connected to the third universal joint at one end and to the fourth universal joint at an opposite end thereof;
 a steady arm pivotally attached to the center deck at a rear end thereof and rotatably attached to the steady shaft at a forward end thereof, the steady arm configured to support the first and second extendable drive shafts in operating alignment when in the field position;
 wherein the at least one drive shaft assembly is configured such that as the wing deck moves upward from the field position to the raised transport position, the steady arm pivots upward from the field position and the first and second extendable drive shafts move out of operating alignment.

19. The apparatus of claim 15 wherein the right and left wing decks are right and left inner wing decks and further comprising right and left outer wing decks, each outer wing deck attached at a rear portion thereof to a corresponding tool bar such that in the field position, the outer wing deck extends substantially horizontally forward from a rear end thereof located below the tool bar, to a front end thereof forward of the tool bar, and such that in the transport positions the outer wing deck extends upward from the tool bar;

right and left outer blades mounted under the right and left outer wing decks such that when in the field position the right and left outer blades are rearward of corresponding right and left inner blades under the right and left inner wing decks, such that cutting paths of the right and left outer blades overlap cutting paths of the corresponding right and left inner blades, and wherein the drive is operative to rotate the outer blades;

wherein each outer wing deck is pivotally attached at an inner edge thereof to an outer edge of the corresponding inner wing deck about a wing pivot axis oriented substantially perpendicular to the longitudinal axis of the corresponding tool bar.

20. The apparatus of claim 19 wherein the inner wing decks and outer wing decks are attached to the tool bars when in the field position such that a selected attachment point on the rear portion of each inner and outer wing deck is supported at a selected distance below the tool bars, and such that lateral portions of each inner and outer wing deck on each side of the attachment point can flex up and down with respect to the attachment point.

21. The apparatus of claim 20 wherein the inner wing decks and outer wing decks are attached to the tool bars when in the field position by a hanger bar fixedly attached at an upper end to the tool bar and pivotally attached at a lower end to the selected attachment point.

22. The apparatus of claim 21 wherein the hanger bar is pivotally attached at the lower end thereof by a ball and socket pivoting connection.

23. The apparatus of claim 20 wherein each inner and outer wing deck is linked to a corresponding tool bar by at least one motion link movable from a field position, where each inner and outer wing deck is free to move relative to the corresponding tool bar, to a transport position, where each inner and outer wing deck is held substantially rigid with respect to corresponding tool bars, and where front portions of the inner and outer wing decks are raised to a position where the wing support mechanisms are disengaged.

24. The apparatus of claim 23 wherein each motion link comprises an L-shaped link member pivotally attached at a mid portion thereof to a corresponding tool bar and an extendable actuator pivotally connected at one end to a top side of a corresponding wing deck, and pivotally connected at an opposite end to a first arm of the L-shaped link member, wherein the motion link is configured such that actuating the extendable actuator in a first direction moves the motion link to the transport position and causes a second arm of the L-shaped link member to bear against the corresponding tool bar, and actuating the extendable actuator in an opposite second direction moves the motion link to the field position and causes the second arm of the L-shaped link member to move away from the corresponding tool bar.

25. The apparatus of claim 24 comprising two laterally spaced motion links connecting each inner wing deck to the corresponding right and left tool bar.

26. The apparatus of claim 19 wherein right and left front caster wheels are located at front ends of corresponding right and left wing pivot axes.

27. The apparatus of claim 15 further comprising right and left restraining cables attached between corresponding right and left tool bars and the center deck configured such that when the tool bars are in the extended position, the restraining cables are tight and prevent further outward movement of the tool bars.

28. The apparatus of claim 15 wherein at least one wing support mechanism comprises a pivot pin oriented substantially in alignment with the operating travel direction when in the field position and mounted on one of the center deck and the adjacent right and left wing decks, and a hook configured to engage the pivot pin and mounted on the other of the center deck and adjacent wing deck.

29. A rotary mower apparatus movable from a field position to a raised transport position, and from the raised transport position to a trailing transport position, the apparatus comprising:

a center deck mounted on center wheels for movement along the ground in an operating travel direction, and a hitch at a front end of the center deck adapted to be attached to a towing vehicle;

right and left tool bars pivotally mounted at inner ends thereof to rear portions of the center deck and movable from an extended position, where the tool bars extend laterally outward from the center deck to corresponding right and left sides of the center deck and incline rearward, to a trailing position where the tool bars extend rearward from the center deck substantially in alignment with the operating travel direction;

a field wheel and a transport wheel mounted on outer portions of each tool bar;

a tool bar actuator operative to move each tool bar from the field position, where the transport wheel is above the ground and where the field wheel is on the ground oriented to roll in the operating travel direction supporting the tool bar above the ground, to the raised transport position where the field wheel is above the ground and the transport wheel is on the ground oriented to roll in a direction substantially parallel to a longitudinal axis of the tool bar supporting the tool bar above the ground;

right and left inner wing decks and right and left outer wing decks attached to corresponding right and left tool bars, each outer wing deck pivotally attached at an inner edge thereof to a corresponding outer edge of the corresponding inner wing deck about a wing pivot axis oriented substantially perpendicular to the longitudinal axis of the corresponding tool bar;

each inner and outer wing deck attached at a rear portion thereof to the corresponding tool bar such that in the field position, each wing deck extends substantially horizontally forward from a rear end thereof located below the tool bar, to a front end thereof forward of the tool bar and supported by a front caster wheel, and such that in the transport positions each wing deck extends upward from the tool bar;

right and left wing support mechanisms mounted to front portions of the center deck and right and left inner wing decks, the wing support mechanisms operative in the field position to engage and pivotally connect front portions of the right and left inner wing decks to corresponding front portions of the center deck such that the front portions of the inner wing decks are supported on the center deck and can pivot up and down with respect to the center deck, and wherein when the front portions of the inner wing decks move upward to the raised transport position, the wing support mechanisms disengage;

a center blade mounted under the center deck, and right and left inner and outer blades mounted under corresponding right and left inner and outer wing decks such that when in the field position the right and left outer blades are rearward of the right and left inner blades, and the right and left inner blades are rearward of the center blade such that cutting paths of the right and left outer blades overlap a cutting path of the right and left inner blades, and cutting paths of the right and left inner blades overlap a cutting path of the center blade;
a drive operative to rotate the center blade and the right and left inner and outer blades; and
a cutting height actuator operative to raise and lower the center deck and right and left inner and outer wing decks with respect to the ground;
wherein, as the center deck is towed forward in the raised transport position, the tool bars pivot rearward with respect to the center deck from the extended position to the trailing transport position.

30. The apparatus of claim 29 comprising a rock shaft pivotally mounted above a rear portion of the center deck about a rock shaft axis oriented substantially perpendicular to the operating travel direction, and wherein inner ends of the right and left tool bars are pivotally attached to corresponding right and left ends of the rock shaft, and wherein the tool bar actuator is operative to rotate the rock shaft about the rock shaft axis.

31. The apparatus of claim 30 wherein the inner end of each tool bar is pivotally attached to the corresponding end of the rock shaft about a first pivot axis and about a second pivot axis oriented substantially perpendicular to the first pivot axis, and wherein the first pivot axis is oriented substantially horizontally and in alignment with the operating travel direction when in the field position, and the first pivot axis is oriented substantially vertically when in the transport positions.

32. The apparatus of claim 29 wherein the drive comprises a main gearbox mounted on the center deck and adapted for connection to a rotating power source on an attached towing vehicle, and right and left drive shaft assemblies connecting the main gearbox to right and left inner wing gearboxes mounted on corresponding right and left inner wing decks, wherein at least one drive shaft assembly comprises:
a first universal joint connected to the main gearbox;
a first extendable drive shaft connected to the first universal joint at one end and to a second universal joint at an opposite end thereof;
a steady shaft connected at one end to the second universal joint and connected at an opposite end thereof to a third universal joint;
a fourth universal joint connected to the corresponding inner wing gearbox;
a second extendable drive shaft connected to the third universal joint at one end and to the fourth universal joint at an opposite end thereof;
a steady arm pivotally attached to the center deck at a rear end thereof and rotatably attached to the steady shaft at a forward end thereof, the steady arm configured to support the first and second extendable drive shafts in operating alignment when in the field position;
wherein the at least one drive shaft assembly is configured such that as the wing deck moves upward from the field position to the raised transport position, the steady arm pivots upward from the field position and the first and second extendable drive shafts move out of operating alignment.

33. The apparatus of claim 32 further comprising right and left outer drive shafts connecting the right and left inner wing gearboxes to corresponding right and left outer wing gearboxes mounted on corresponding right and left outer wing decks.

34. The apparatus of claim 29 wherein the inner wing decks and outer wing decks are attached to the tool bars when in the field position such that a selected attachment point on the rear portion of each inner and outer wing deck is supported at a selected distance below the tool bars, and such that lateral portions of each inner and outer wing deck on each side of the attachment point can flex up and down laterally with respect to the attachment point.

35. The apparatus of claim 34 wherein the inner wing decks and outer wing decks are attached to the tool bars when in the field position by a hanger bar fixedly attached at an upper end to the tool bar and pivotally attached at a lower end to the selected attachment point.

36. The apparatus of claim 35 wherein the hanger bar is pivotally attached at the lower end thereof by a ball and socket pivoting connection.

37. The apparatus of claim 29 wherein each inner and outer wing deck is linked to a corresponding tool bar by at least one motion link movable from a field position, where each inner and outer wing deck is free to move relative to the corresponding tool bar, to a transport position, where each inner and outer wing deck is held substantially rigid with respect to the corresponding right and left tool bars, and where front portions of the inner and outer wing decks are raised to a position where the wing support mechanisms are disengaged.

38. The apparatus of claim 37 wherein each motion link comprises an L-shaped link member pivotally attached at a mid portion thereof to the corresponding right and left tool bar and an extendable actuator pivotally connected at one end to a top side of the inner right and left wing decks, and pivotally connected at an opposite end to a first arm of the L-shaped link member, wherein the motion link is configured such that actuating the extendable actuator in a first direction moves the motion link to the transport position and causes a second arm of the L-shaped link member to bear against the corresponding tool bar, and actuating the extendable actuator in an opposite second direction moves the motion link to the field position and causes the second arm of the L-shaped link member to move away from the corresponding tool bar.

39. The apparatus of claim 38 comprising two laterally spaced motion links connecting each inner wing deck to the corresponding right and left tool bar.

40. The apparatus of claim 29 wherein right and left front caster wheels are located at front ends of the corresponding right and left pivot axis.

41. The apparatus of claim 29 further comprising right and left restraining cables attached between the corresponding right and left tool bars and the center deck configured such that when the tool bars are in the extended position, the restraining cables are tight and prevent further outward movement of the tool bars.

42. The apparatus of claim 29 wherein the at least one right and left wing support mechanism comprises a pivot pin oriented substantially in alignment with the operating travel direction when in the field position and mounted on one of the center deck and the adjacent inner wing decks, and a hook configured to engage the pivot pin and mounted on the other of the center deck and adjacent wing deck.

* * * * *